United States Patent [19]
Bullock et al.

[11] Patent Number: 5,675,358
[45] Date of Patent: Oct. 7, 1997

[54] DIGITAL IMAGE CAPTURE CONTROL

[75] Inventors: Garland Ray Bullock; Albert Durr Edgar, both of Austin; Steven Craig Penn, Georgetown, all of Tex.

[73] Assignee: International Business Machines Corporation, Armonk, N.Y.

[21] Appl. No.: 224,056

[22] Filed: Apr. 7, 1994

Related U.S. Application Data

[63] Continuation of Ser. No. 925,339, Aug. 4, 1992, abandoned.
[51] Int. Cl.⁶ ..................................................... G09G 5/00
[52] U.S. Cl. .......................... 345/115; 345/119; 388/211; 388/33
[58] Field of Search .......................... 348/552, 333, 348/334, 211, 213; 345/115, 116, 118, 119, 120; 395/155, 157, 159, 332, 340, 348, 977

[56] References Cited

U.S. PATENT DOCUMENTS

| | | | |
|---|---|---|---|
| 4,286,289 | 8/1981 | Ottesen et al. | 340/712 |
| 4,714,957 | 12/1987 | Takano | 358/903 |
| 4,731,743 | 3/1988 | Blancato | 358/903 |
| 4,825,365 | 4/1989 | Inoue | 364/413.19 |
| 4,855,813 | 8/1989 | Russell et al. | 358/903 |
| 4,882,582 | 11/1989 | Oka | 340/712 |
| 4,991,004 | 2/1991 | Hayashi et al. | 35/76 |
| 4,992,866 | 2/1991 | Morgan | 358/108 |
| 5,098,426 | 3/1992 | Sklar et al. | 606/5 |
| 5,161,213 | 11/1992 | Knowlton | 395/128 |
| 5,186,629 | 2/1993 | Rohen | 434/116 |

FOREIGN PATENT DOCUMENTS 0247788  2/1987  European Pat. Off. .

OTHER PUBLICATIONS

IBM Technical Disclosure Bulletin, vol. 33, No. 3B, Aug. 1990, p. 116—Combined-User Interface For Computers, Television, Video Recorders, and Telephone, etc.
IBM Technical Disclosure Bulletin, vol. 34, No. 6, Nov. 1991, p. 36—Digital Video Direction and Speed Controls.
IBM Technical Disclosure Bulletin vol. 31, No. 2, Jul. 1988, p. 57—Motion Tracking Using digitized Motion Video.
IBM Technical Disclosure Bulletin vol. 34, No. 7A, Dec. 1991 p. 402—Multimedia Bitmap Video Imaging In An OS/2 Window.

Primary Examiner—Dennis-Doon Chow
Attorney, Agent, or Firm—Jeffrey S. LaBaw

[57] ABSTRACT

A method and apparatus for controlling and displaying the image information presently seen by the image capture device together with those images which have been captured and stored upon actuation of the device. In a preferred embodiment, a viewfinder window is located in a capture device window. The capture device window also includes a variety of push buttons, some of which control the image capture device, others of which control the way in which the captured images are displayed on the computer screen. In response to the user command to capture an image, the image will be displayed adjacent to the image capture window. As the user continues to capture images, the frames are displayed as long as the computer has adequate temporary storage. Means to discard some images are also included in the user interface. Preferably, the discarded images are retained to allow the maximum reversibility of decisions to the discard images. The user interface also allows the user to stack a set of images into a single object in the workspace. Images may be manipulated within the stack, discarded or modified or changed between stacks of image objects.

28 Claims, 25 Drawing Sheets

Main capture device (camera) application (window) logic

DIGITAL IMAGE CAPTURE CONTROL

This is a continuation of application Ser. No. 07/925,339 filed Aug. 4, 1992, now abandoned.

BACKGROUND OF THE INVENTION

This invention relates generally to computer control of machines, more particularly, it relates to the computer control and user interface of a tightly coupled instant digital image capture device.

Computer control of image devices such as a photo copier or x-ray or sonography imaging devices is known. Menus listing possible selections are presented in a display attached to the device. However, the hardware and software which control the image devices are typically special purpose and do not work with other independently designed software or peripherals. The menus and display of images are mapped to a physical display space within the overall display.

Further, the software designed for an x-ray, sonography or tomography device is usually very complex. While the operator of the device is usually a highly trained technician and can learn to operate the imaging device, the user interface is not typically very user friendly.

In general purpose computers, object oriented graphical user interfaces have been developed to enable a user to interact with the computer system and the data stored within by using an object-action paradigm. The user interfaces represent information such as data files and the applications which manipulate the data file as objects. Objects are logical structures within the user interface. Each object will generally have some associated properties which constrain its behavior when acted on by the computer system. Examples of such object oriented graphical user interfaces include IBM's OS/2™, Version 2.0, Hewlett-Packard's NewWave™ and the operating systems of the Apple Corporation.

The present invention builds on the prior art to construct a simple, intuitive user interface for control of a digital image capture device.

SUMMARY OF THE INVENTION

It is therefore an object of the invention to provide an intuitive, object-oriented user interface to control an image capture device.

This and other objects and features of the invention are achieved by a method and apparatus for displaying an object oriented user interface, the interface containing objects with image information presently seen by the image capture device together with objects containing images which have been captured and stored upon actuation of the device. In the interface, objects are presented on the display as a window or an icon. In a preferred embodiment, a viewfinder window is located within a capture device window. The capture device window also includes a variety of push buttons, some of which control the image capture device, others which control the way in which the captured image windows are displayed on the computer screen. In response to the user command to capture an image, most likely from a push button, the image will be displayed in its own window along side the capture device window. As the user continues to capture images, new image windows are displayed as long as the computer has adequate temporary storage. Means to discard some images are also included in the user interface. Preferably, the discarded images are retained in a trash stack object to allow the maximum reversibility of decisions to discard images. The user interface also allows the user to stack a set of captured image objects into a single object in the workspace called a stack object. Images may be manipulated within the stack object, discarded or modified or changed between different stacks of images.

The invention allows a variety of users, novice to expert, to control an image capture session utilizing a computer assisted instant digital image capture device. The session involves capturing images, evaluating images and specifying the initial disposition of each captured image.

BRIEF DESCRIPTION OF THE DRAWINGS

This invention will become more easily understood by reference with the attached drawings and following description.

DETAILED DESCRIPTION OF THE DRAWINGS

Figure 1:
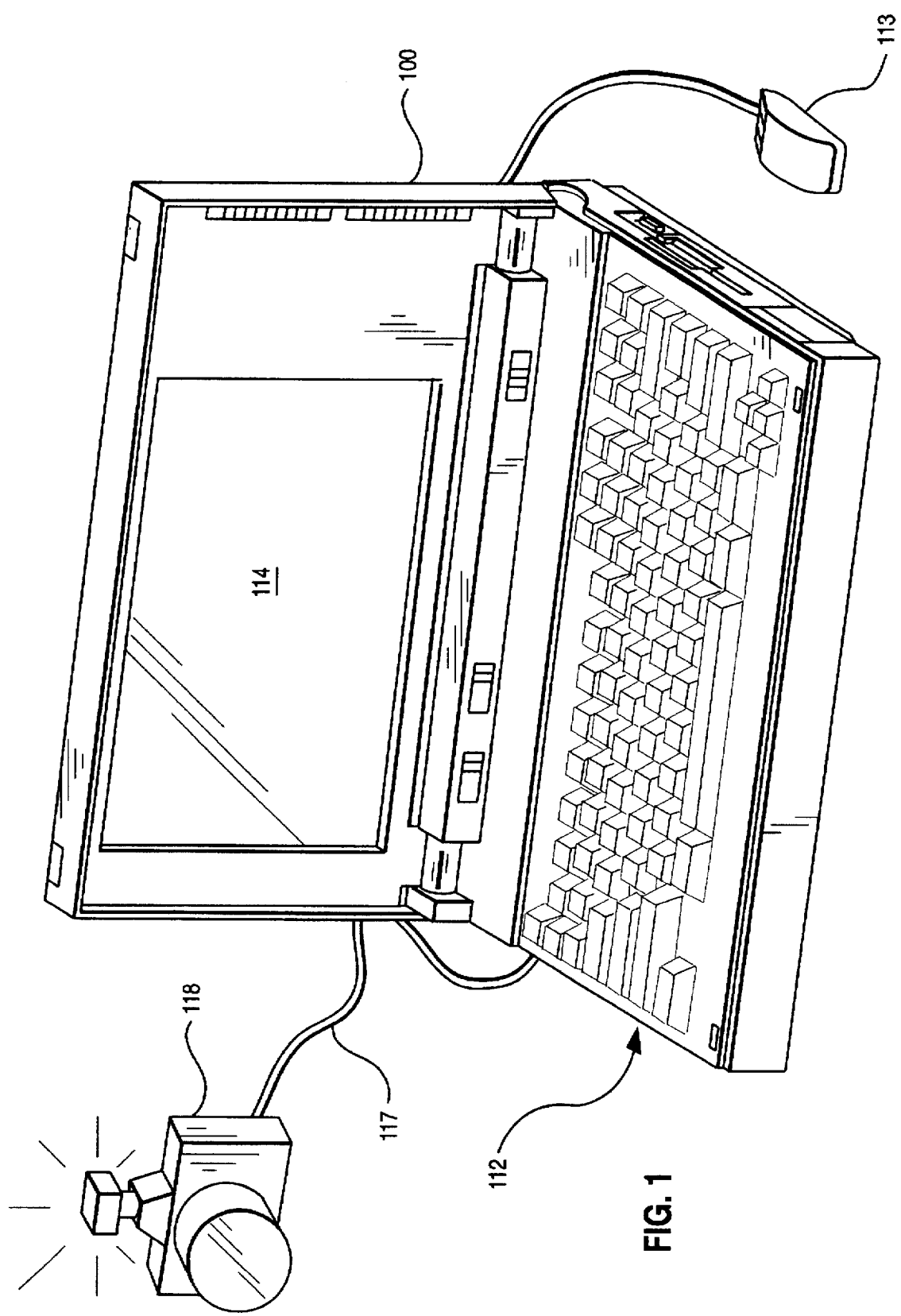
FIG. 1 is a representation of a notebook personal computer system, having attached a tethered digital image capture device.

In FIG. 1, a notebook personal computer 100 preferably one in the IBM PS/2 series of computers, comprising a keyboard 112, a mouse 113 and a display 114 is depicted. The screen of the display device is used to present the image during an image processing session. The computer is connected by means of a tether 117 to digital image capture camera 118. The tether 117 includes cables which carry power and control information to the digital capture device 118 and the captured image data back to the computer 100.

Figure 2:
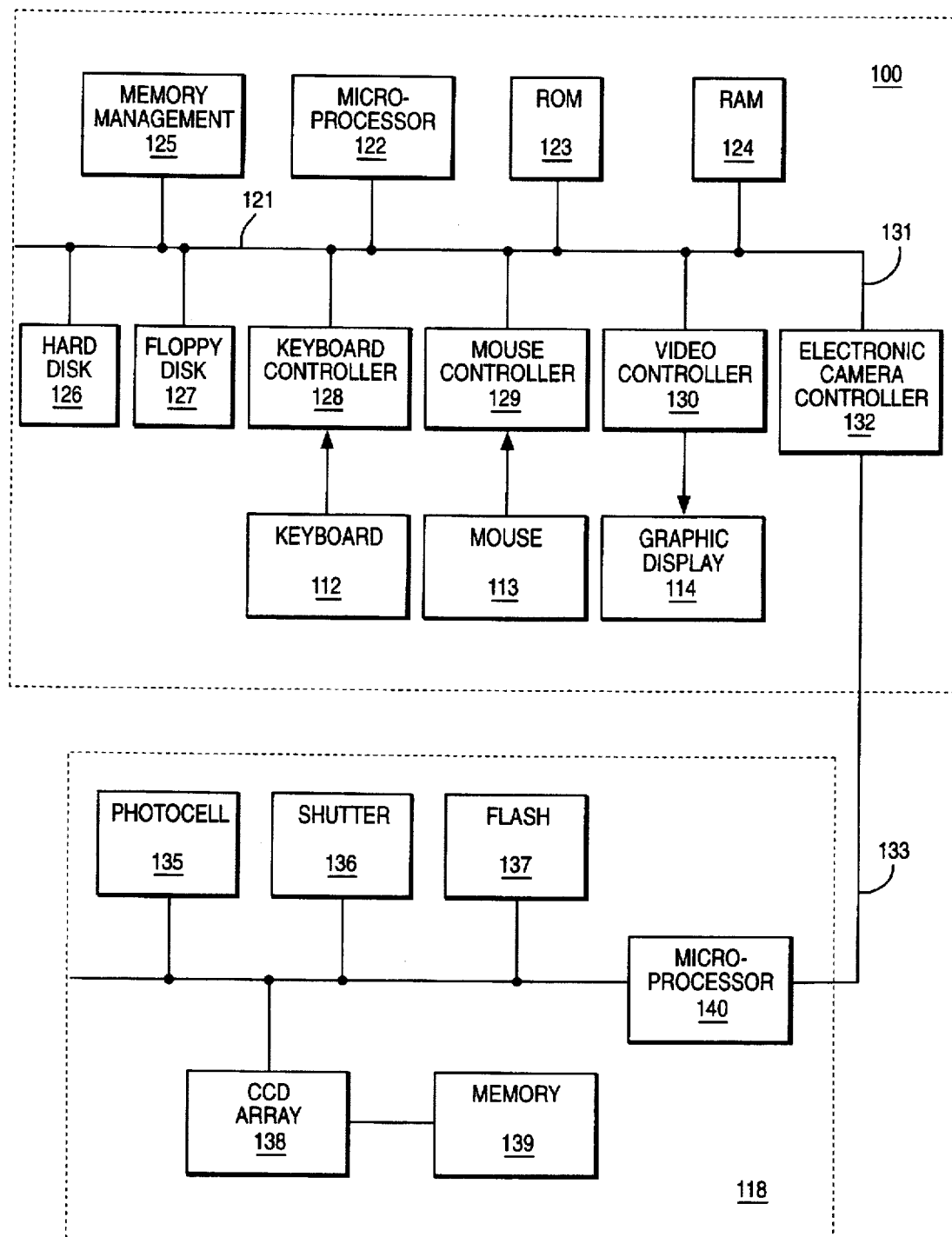
FIG. 2 is a block diagram of the computer system/image capture device combination.

FIG. 2 shows a block diagram of the components of the computer/camera combination shown in FIG. 1. The computer 100 includes a system bus 121 to which various components are coupled and by which communication between the various components is accomplished. A microprocessor 122 is connected to the system bus 121 and is supported by read only memory (ROM) 123 and random access memory (RAM) 124 also connected to system bus 121. The microprocessor 122 is one of the Intel family of microprocessors including the 8088, 286, 388, 486 or 586 microprocessors. However, other microprocessors including, but not limited to Motorola's family of microprocessors such as the 68000, 68020 or the 68620 microprocessors and various Reduced Instruction Set Computer (RISC) microprocessors manufactured by IBM, Hewlett Packard, Sun, Motorola and others may be used in a specific notebook computer.

The ROM 123 contains among other code the Basic Input/Ouput System (BIOS) which controls basic hardware operations such as the interactions of the disk drives 126 and 127 and the keyboard 112. The RAM 124 is the main memory into which the operating system and the image application programs are loaded, including the user interface of the present invention. The memory management chip 125 is connected to the system bus 121 and controls direct memory access operations including, passing data between the RAM 124 and a hard disk drive 126 and floppy disk drive 127.

Also connected to the system bus 121 are three I/O controllers: the keyboard controller 128, the mouse controller 129 and the video controller 130. As might be expected, the keyboard controller 128 provides the hardware interface for the keyboard 112, the mouse controller 129 provides the hardware interface for mouse 113 and the video controller 130 is the hardware interface for the display 114. Lastly, an electronic camera controller card 132 is coupled to system bus 121 to provide control of the image capture device 118.

The logic inside the computer controls the camera 118 via a bus 131 in the electronic camera controller card 132. The controller card 132 could be a PCMCIA card. Inside the camera 118, a microprocessor 140 exerts control over camera resources including the charge coupled device (CCD) array 138 which acts as an image sensor, a shutter 136 and a flash 137. In the preferred embodiment the microprocessor passes controls to the camera resources to the computer system 100 via tether 117, controller 132 and bus 131. These controls include triggering an exposure, triggering the flash 137, reading images from the CCD 138 or camera memory 139, and other camera functions.

Figure 3:
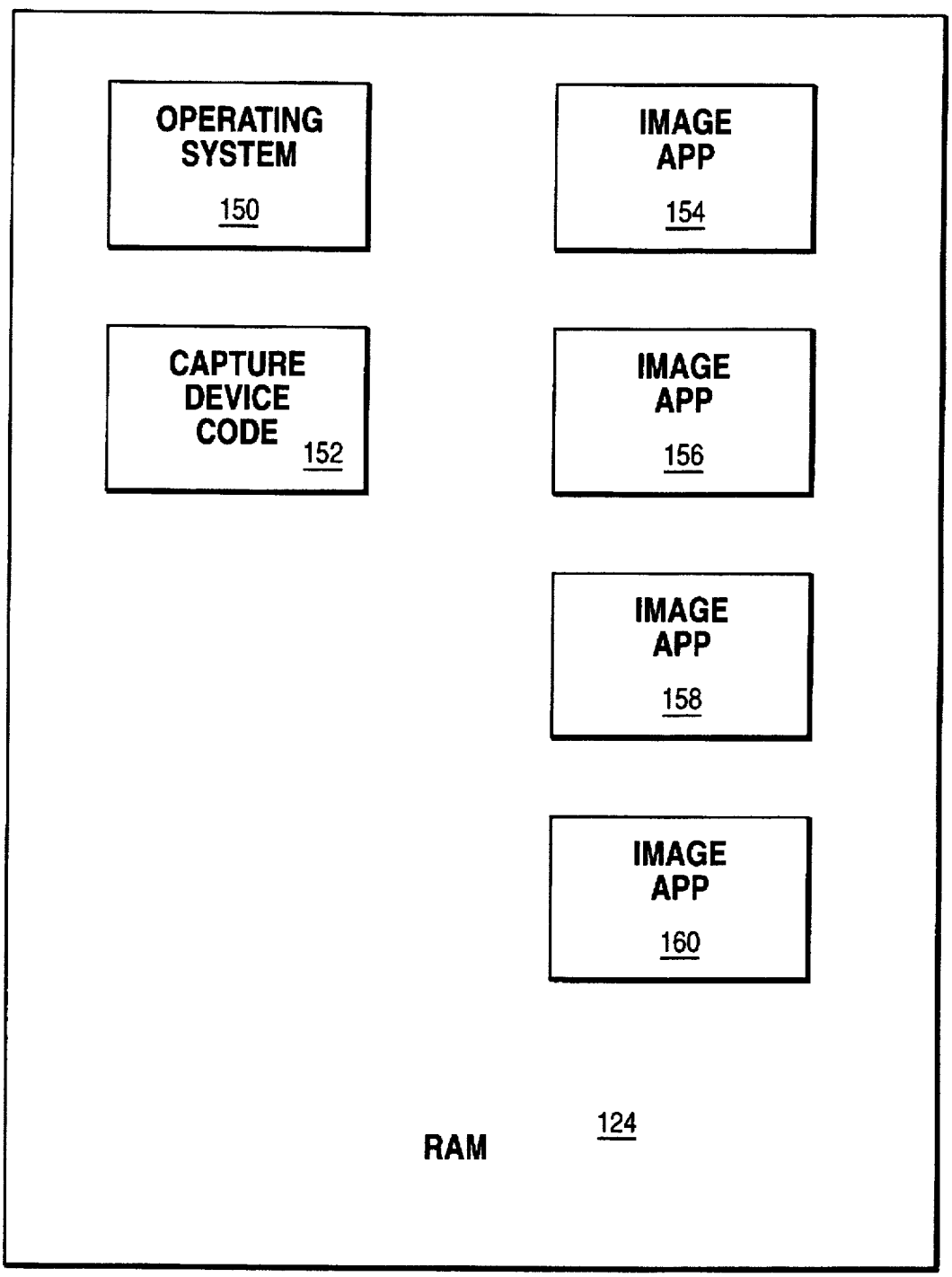
FIG. 3 depicts several image applications active in the system memory together with a digital image capture control program according to the present invention.

The operating system on which preferred embodiment of the invention is implemented is IBM's OS/2™ Version 2.0, although it will be understood that the invention could be implemented on other and different operating systems. As shown in FIG. 3, an operating system 150 is shown resident in RAM 124. The operating system 150 is responsible for determining which user inputs from the keyboard 112 and the mouse 113 go to which of the applications, transmitting those inputs to the appropriate applications and performing those actions as specified by the application and response to that input. For example, the operating system would display the result of the capture image to the user on the graphic display 114. The operating system 150 includes a presentation manager which is responsible for presenting the applications in a uniform and consistent manner within the graphical user interface. For more information on IBM's OS/2 operating system, the reader is referred to *OS/2 2.0 Programming Guide*, Vol. II, Order No. 510G-6494-00, and *OS/2 2.0 Presentation Manager Programming Reference*, Vols. I, II and III, Order Nos. 510G-6264-00, 510G-6265-00, 510G-6272-00. Also resident in RAM 124, is the capture device program 152 and a plurality of image programs 154 through 160 which provide functions such as, image editing, color enhancement, image sizing, format conversion, archiving and image distribution.

The user interface in the capture device code 152 is designed to support digital still image capture devices. The user interface as illustrated in FIGS. 4–18 and its underlying functions will be critical as image capture becomes more common, more portable and less expensive. While invention described herein would apply to virtually any image capture situation, it is fully exploited in a closely integrated computer/capture device that produces essentially instant feedback for captured images. These closely integrated capture devices are the most interesting because they utilize the computer for traditional and nontraditional control functions. Thus, the package camera/computer is far more integrated and also reduces the cost by not requiring the capture device to perform all of the control functions independent of the computer.

It should be noted, however, that many of the concepts described in this invention would also be beneficial in less integrated systems where the capture device can perform some or all of the control functions, and even in those where the capture device performs some of the intermediate storage functions. Since the less integrated environments present essentially a subset of functions from that of the more closely integrated environments, the remainder of this disclosure will concentrate on the closely integrated solution, making reference to the other environments as appropriate.

In the closely integrated system, the images taken by an instant camera are presented in the work-surface of the attached computer display for purposes of comparison, ordering, discarding, and initial distribution. The system allows the user to capture images and then evaluate those images for future use, e.g., decisions regarding retention. It assumes that all subsequent functions, e.g., image editing, color enhancement, sizing, format conversion, archiving, and any other distribution will be the function of other image applications.

Figure 4:
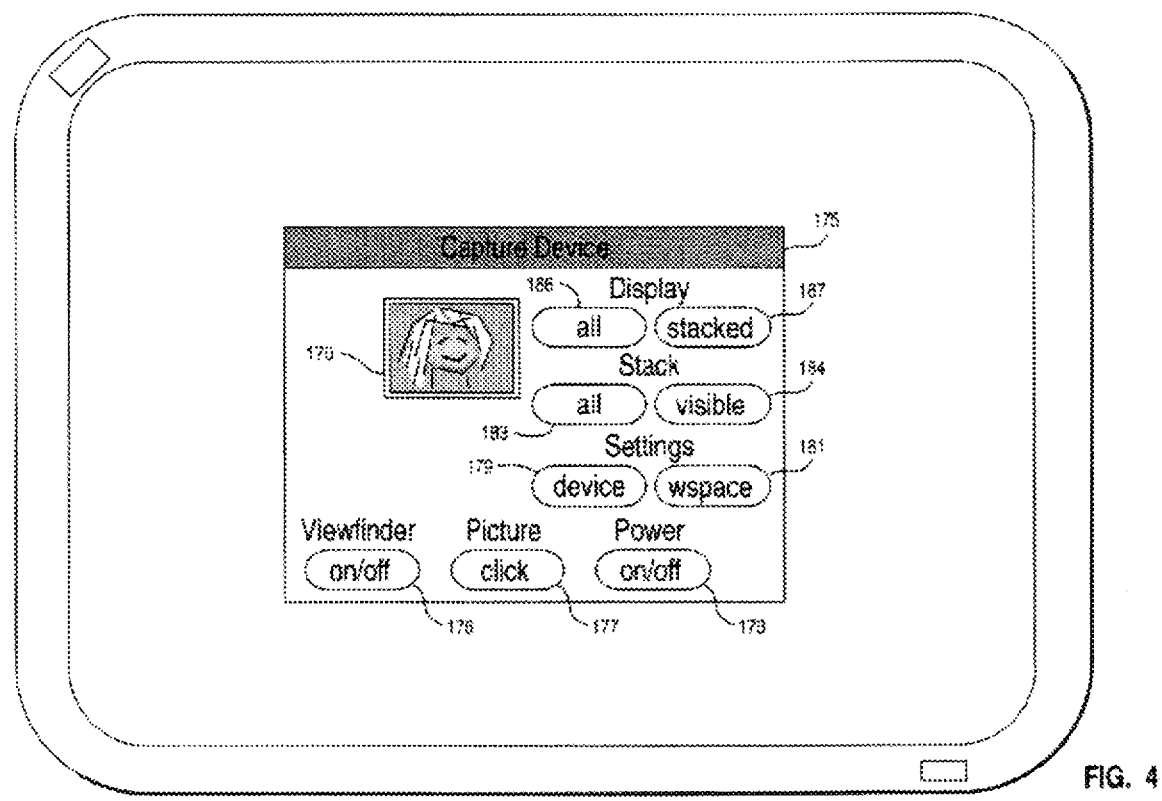
FIG. 4 illustrates the computer display containing the initial capture device window according to the invention.

The highly integrated computer/capture device utilizes the computer for many of the control functions and all of the image display and selection functions. Of particular importance is the operation of the capture-device's viewfinder. As shown in FIG. 4, the computer provides the display of the viewfinder window 170 within the capture device window 175. The viewfinder 170 could display anything from full color at video rates to black & white at only a few frames per second depending on the capabilities of the image capture device and the computer. While some of these options may be more desirable than others, all provide adequate viewfinder function to compose the scene before capturing the associated still images. As both the viewfinder window 170 and capture device window 175 are logical objects with the workspace object within the OS/2 environment, they share all the advantages of display configuration and compatibility with other OS/2 objects. The workspace object usually has the entire display at its disposal and all other objects displayed are contained within. The workspace could be unique to the capture device operation or it could be the desktop object managed by OS/2. In the latter case, the workspace would likely contain other objects not necessarily related to the capture device picture selection operations.

A capture device window 175 also includes several exposed control buttons. The viewfinder control turns the solid-state array on so long as the power to the image capture device is also being supplied by the computer on actuation of the power button 178. An image is captured when the user selects the picture button 177. The above controls control the image capture device. Also included in the capture device window 175 are controls which determine the method of presentation, selection and storage of the images. For example, the settings button 179 and 181 determine the settings of the image capture device and of the displayed images on the computer screen respectively. The stack buttons 183 and 184 determine whether all images displayed are to be stacked or rather only those which are currently display to be stacked. The display controls 186 and 187 control global stacking functions. The first global stacking function allows "all" stacked images to be displayed along with currently displayed images (resulting in all workspace images being displayed). The second global stacking function allows only "stacked" images to be displayed which causes all currently displayed images to be stacked.

Figure 5:
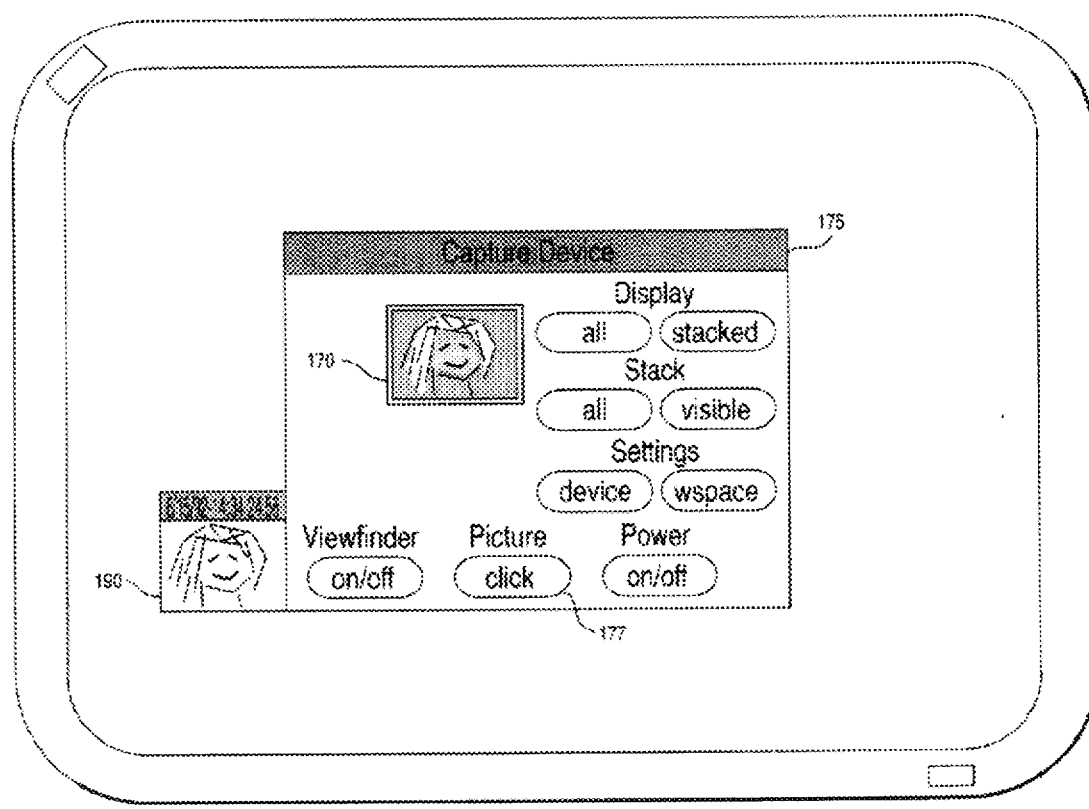
FIG. 5 is an illustration of the computer display including the capture device window and the first image capture by the image capture device.

Exactly what occurs when power is turned on and when a picture is taken by pressing the picture button 177 could be determined by user preference specified by the use of the "settings" buttons 179, 181 functions. However, when the capture system was first used, it would be important for it to behave in a fashion that would be easily understood by the beginning user, whether that user is experienced or inexperienced in image applications. Thus, it is assumed that initially (i.e., before any user customization) that when the "Capture Device" application is started, the window 175 shown in FIG. 4 would appear essentially centered on the computer screen, with the capture device powered on, and the viewfinder 170 also on. The user would see, within the viewfinder window 170 what the capture device was currently seeing. To capture (take) a picture, the user would simply compose the desired scene in the viewfinder by moving the capture device, attached to the computer, and then press the "Picture" button "click". "Pressing" could be accomplished with a touch screen using a finger or a stylus, via a mouse or even with an associated key from any attached keyboard. The result of pressing the control 177 would be to display a representative rendering of the image in its own window 190 captured essentially instantly (hopefully within a second). The results of this operation could look as is illustrated in FIG. 5. This image would be in color if the capture device was capable of color imaging.

Figure 6:
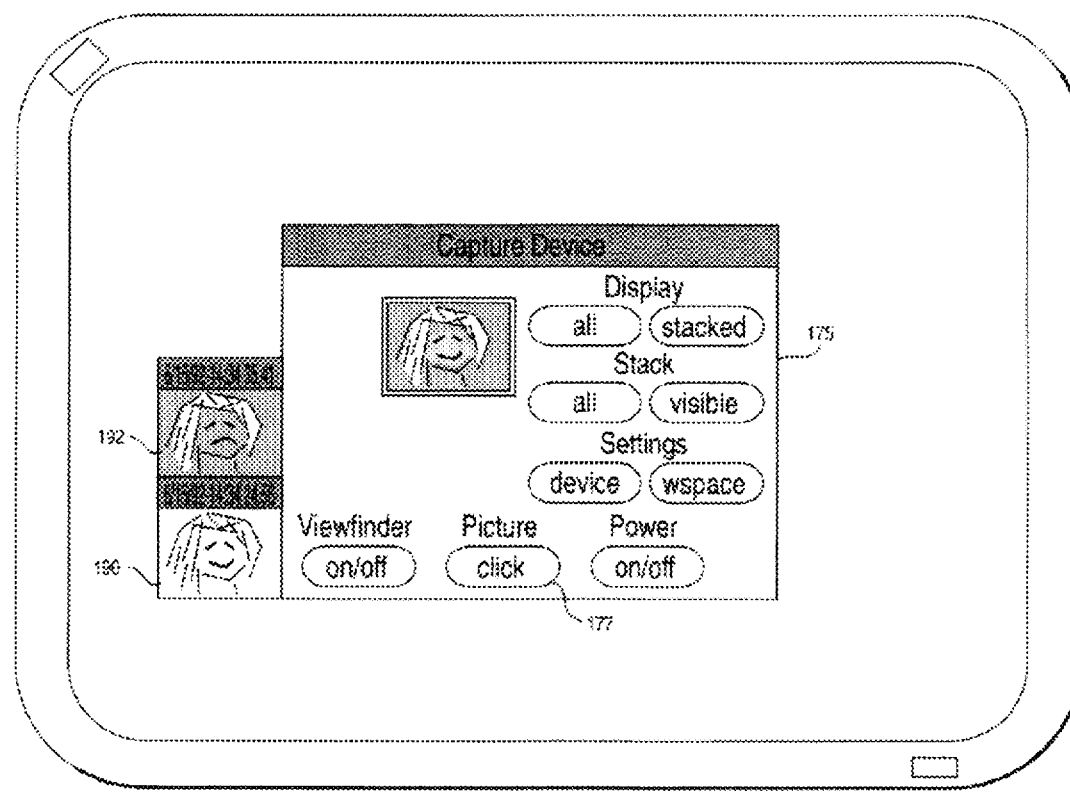
FIG. 6 is an illustration of a computer display depicting the capture device window and two images captured by the image capture device.

The user might be unsatisfied with the quality of the picture, e.g., lighter than desired, but would not want to discard the image because it might turn out to be the best one possible. In this case, which is the common case, the user would take another picture, by selecting the picture button 177. A second image window 192 appears along side the first image window 190 as shown in FIG. 6.

Figure 7:
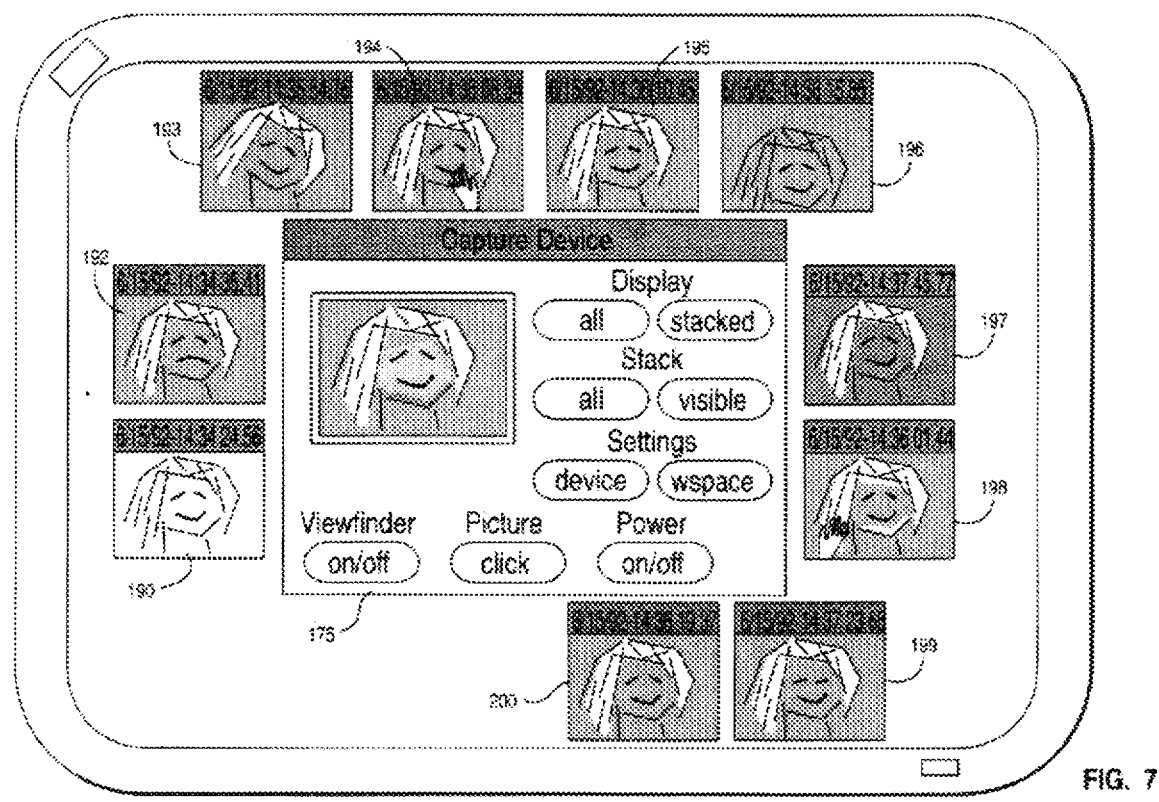
FIG. 7 is an illustration of the capture device window and a plurality of captured images surrounding the window.

Now the lighting seems appropriate but the subject's facial expression is not what is desired and a third picture is taken. The user may then continue taking pictures as long as desired and as long as the computer has adequate temporary storage. This continued operation could result in a plurality of image windows 190–200 displayed around the capture device window 175 portraying all the captured images in the user interface as shown in FIG. 7.

At this point, the user may feel that there are enough pictures to choose appropriate ones, or may be forced to stop due to the subject no longer being available. If the user is sure that some pictures may not be wanted: they can be discarded by moving the cursor to the image and selecting the discard function as illustrated for a image window 196 in the FIG. 8.

Figure 8:
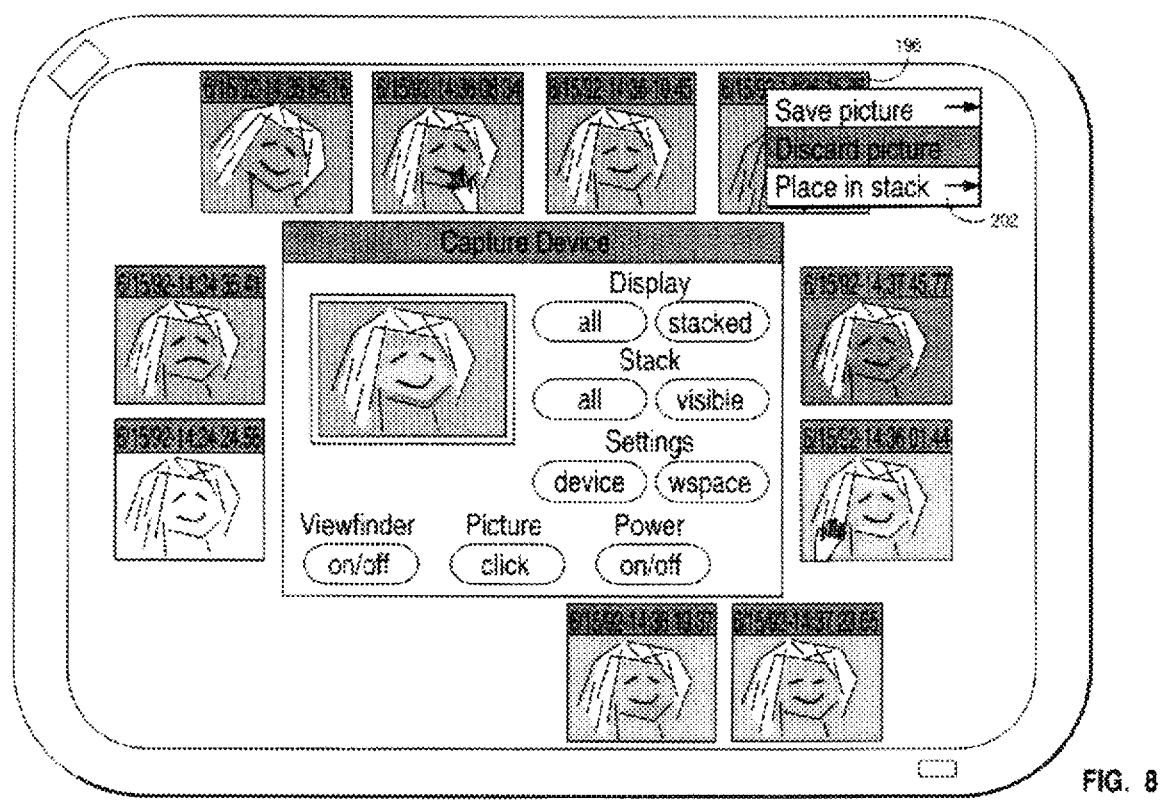
FIG. 8 is an illustration of the set of images in FIG. 7, in which a pop-up window is placed over an image for manipulation.

Discarding, shown in FIG. 8 as implemented via a pop-up menu 202, could also be implemented by some type of direct manipulation, selecting the appropriate item by moving a cursor, depressing a mouse button or touching a touch screen. However, it could also be object manipulation (e.g., dragging the picture to a trash icon and dropping it on the icon, or dragging it off the screen). The specific choice would depend on the user's preferences and the functions supported, or not supported, by the operating system. For example, dragging to the screen's edge might not work in the case where the operating system's logical screen is bigger that the hardware's physical screen, and the cursor approaching the screen's edge is a signal for scrolling the logical screen.

Figure 9:
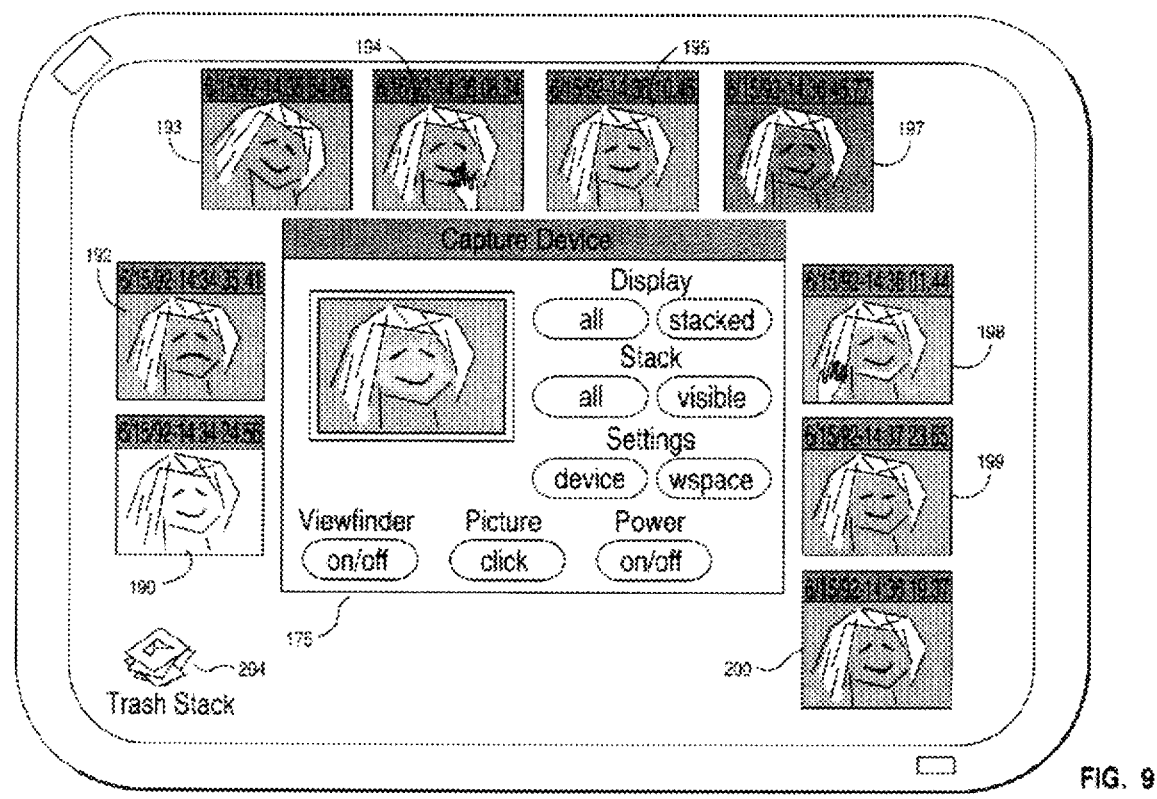
FIG. 9 is an illustration of the display in FIGS. 7 and 8 after a first image has been discarded.

The result of the "Discard" operation would leave the screen as shown in FIG. 9. Note that as a result of the first delete, one image window 196 is deleted from the screen and a "Trash Stack" object 204 was created to hold the discarded images as long as possible. The trash stack object 204 will retain the discarded images until storage space is needed and then the oldest image(s) will be physically deleted to accommodate the newest deleted captured images. The trash stack 204 will allow the maximum possible reversibility of decisions to discarded images. Manipulation of this stack object 204 is similar to that described for normal "Picture stack" objects described below. However, none of the general stack display functions are applicable, thus leaving only the ability to "flip" through the images in the trash stack 204. In an alternative embodiment, it would be possible to initialize the capture application with an empty trash stack if that were deemed more desirable to support direct drag and drop deletes.

If the user continued to take pictures until the screen area was filled with images, the user interface would display subsequent pictures either by overlapping them with previous pictures, or be automatically placing in a "Picture Stack" object. The exact manner in which this overflow case would be handled depends upon the customization selected by the user under the "Settings wspace" button, and the particular capabilities and limitations of the operating system upon which the capture application is running.

The user could continue to take more pictures, or save and discard pictures. The save function results in an opportunity to specify some new path and file name different from the default if the user desires. When the save function is exercised, the image window representing the image to be saved contains the pointer (cursor) when the save menu is selected just as with the "Discard picture" function. If the user saves the image, the image window object is removed from the work space just as when the image was deleted, except, of course, that the image is saved on permanent storage instead of being removed form the system. If the user wishes to delay saving a picture, he/she can put all images destined to be saved in a picture stack as described below for saving after all selection decisions have been made.

The user interface allows for one additional level of work space segmentation. This is the "Picture Stack". The picture stack is an object on the work space just like the captured image object; it represents a temporary repository which can contain any number of images on the work space. Picture stacks are created when the user attempts to place any images or set of images into a stack that does not already exist. At initiation for the first time, there are no picture stacks and the user can operate indefinitely as described above without the use of pictures stacks in any way. However, when the user's picture capture session requires the temporary retention of more pictures than can be displayed directly on the work space, it may be desirable, and helpful as well, to put certain pictures into picture stacks to temporarily free up display area on the screen for subsequent pictures.

The user interface is designed to help the user in selecting the "keepers", the images to actually save, without requiring him to make premature choices. Otherwise, the user might possibly discard images that would have later proved to be the best choices. The processing and storage capacities of the computer, the close integration of the capture device, and the essentially instantaneous results from the taking of a picture all serve to make this environment much more productive and error free than the current instant camera processes. Alternatively, picture stacks could be created by direct manipulation, e.g., placing one picture directly on top of another picture, by dragging and dropping.

Figure 10:
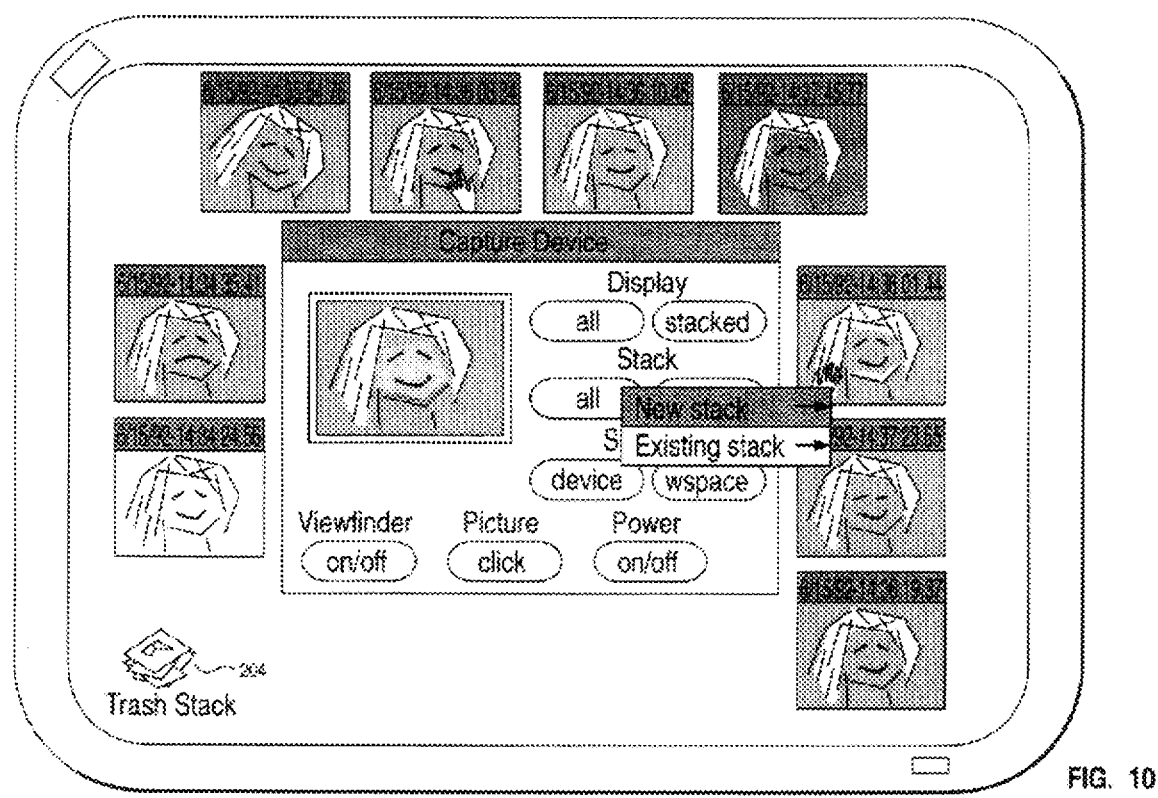
FIG. 10 is an illustration of the user interface in which a stack object has been called.
Figure 11:
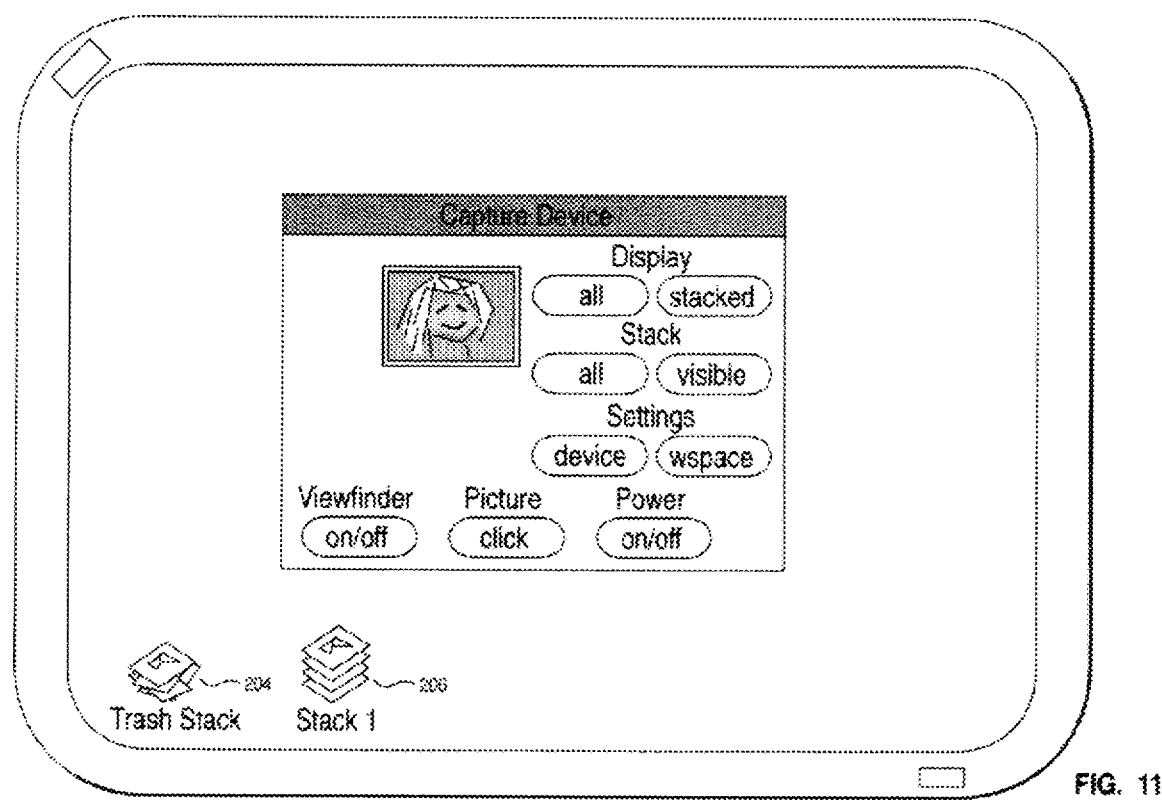
FIG. 11 shows the result of the stacking operation.

Next, the user wishes to temporarily retain the images already captured, less the ones discarded, in a picture stack object as described above and go on to another subject. In the user interface displayed in FIG. 8, the user could individually stack each image by placing the mouse pointer on the image window and using the "Stack picture" function or dragging and dropping the picture on the stack object. Each individual image could be directed to different picture stacks as the user desired. An alternative method is to place all images that are on the display in a stack. This is accomplished by selecting the appropriate option from the main window via one of the "Stack" buttons. In FIG. 8, either option would perform equally well because all images are visible and completely displayed without being overlapped by some other image. As illustrated in FIG. 8, the user could select the subordinate menu indicated by the right facing arrow to specify a stack name, but in this case will-accept the default naming which will result in the creation of a picture stack named "Stack 1" 206 which will appear as a icon on the screen and all pictures will be placed in that newly created stack. An illustrative user interface display is shown in FIGS. 10-11. An alternative embodiment option for displaying a picture stack would be to show the stack with the first picture in the stack on top. It would not be necessary to name the stack because it would be identified visually by the displayed picture.

Figure 12:
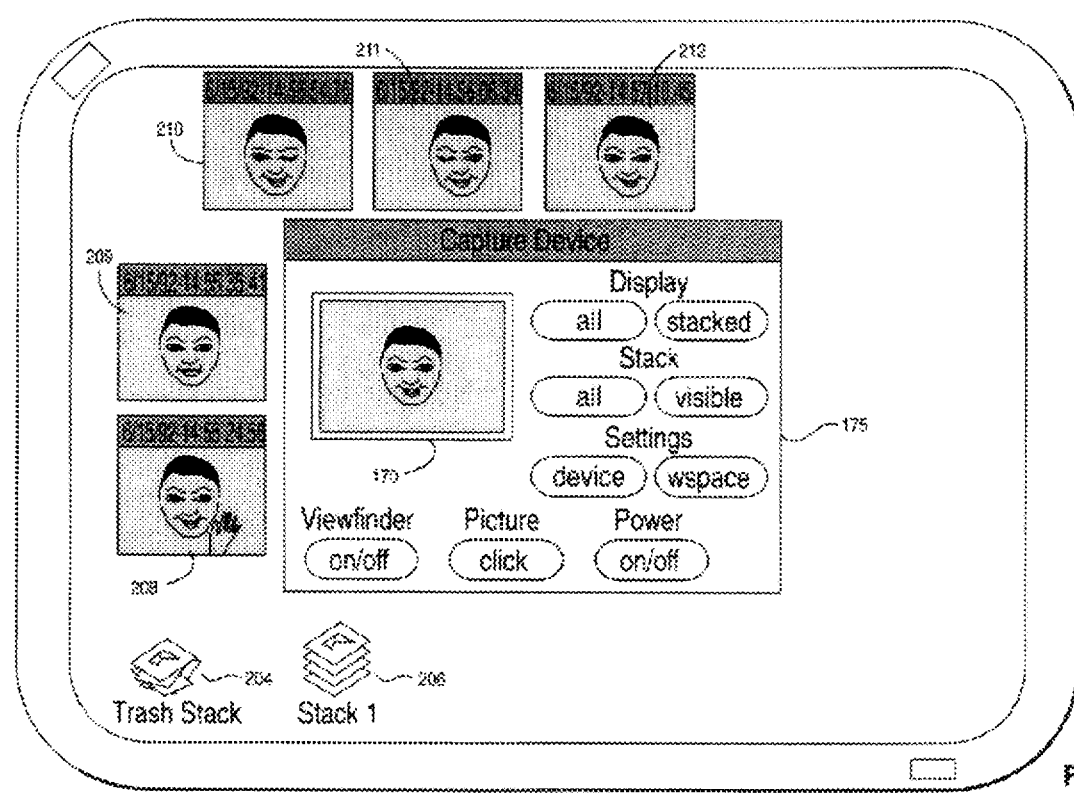
FIG. 12 is an illustration of the user interface during a second image capture session where the images captured in a first image capture session illustrated in FIG. 4 through 11 are stored in a stack object.

The user could continue image capture with the next subject. As above, several new images are captured of the new subject and displayed in new image windows 208-212 as is illustrated in FIG. 12. The user uses the user interface to handle each image in the present set of image windows 208-212 as he/she did with the previous group of images.

Figure 13:
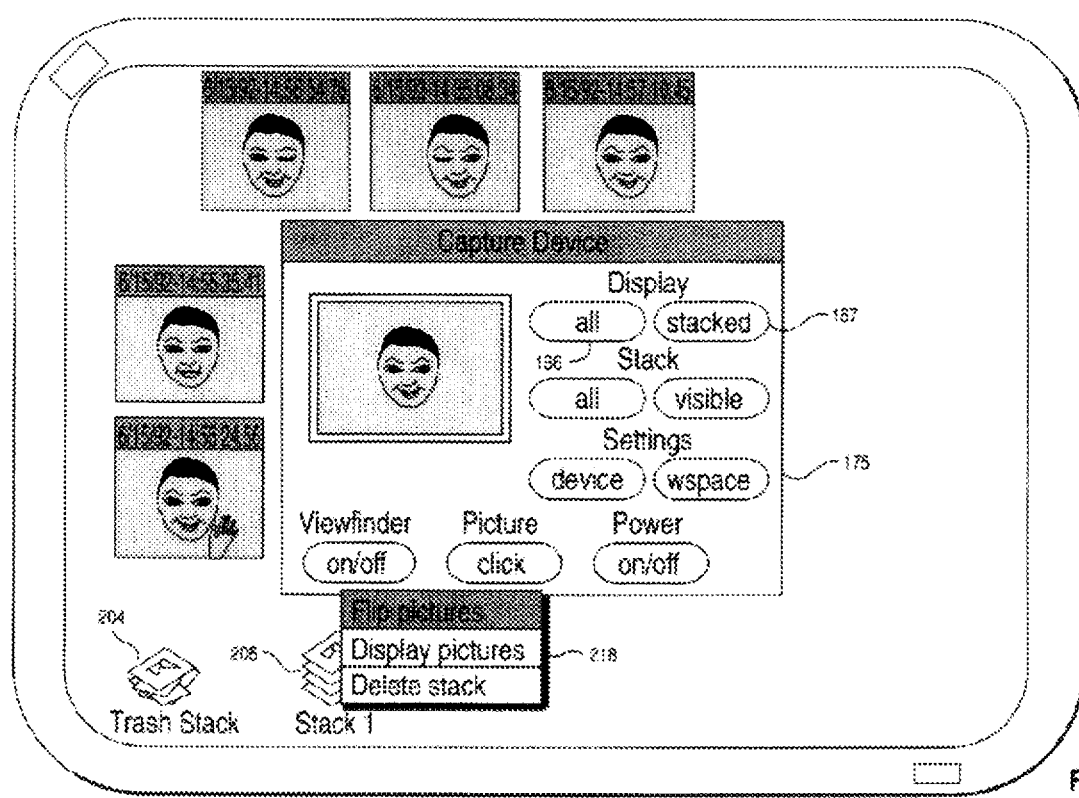
FIG. 13 is an illustration of the user interface in which a stack operation menu is presented.
Figure 14:
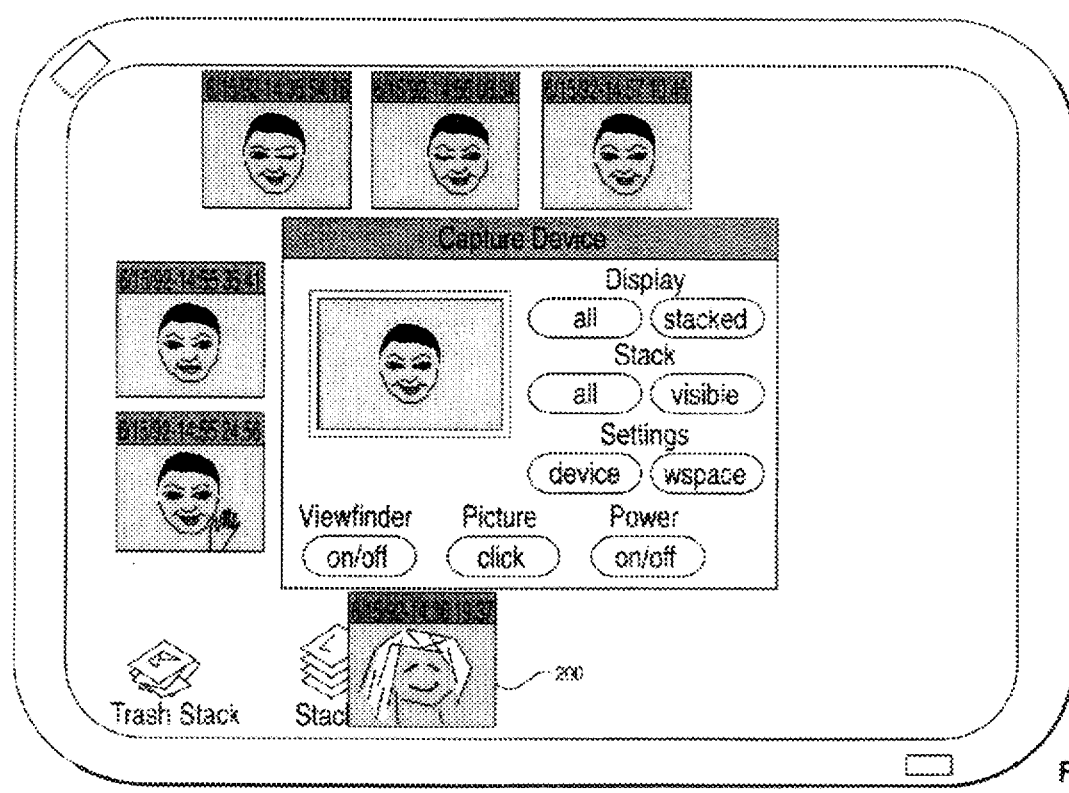
FIG. 14 and 15 are illustrations of the user interface in which the flip pictures operation from the stack menu has been selected.

In FIGS. 12 and 13, the previous set of image objects is in temporary storage in the "Stack 1" object 206. Images from the stack 206 may be displayed in several ways. One would be to display the stacked pictures via the "Display" function buttons on the main capture device window 175. The "Display all" button 186 would display the contents of all stacks, except the trash stack 204, along with those images currently displayed, thus resulting in the full display of all images on the temporary work space. "Display all" might well result in the overlap of some images. Alternatively, the user could display the stacked images, via the "Display stacked" button which would result in the stacked images being displayed while at the same time placing the currently displayed images in a new stack object. In this way, the user could toggle between the two sets of images, each alternative 14 stored in its own stack object.

Another very helpful feature is to go to the stack object 206 via the pointer and flip through the images one by one in a manner similar to a user flipping through stacks of physical pictures on a physical work space. It should be noted that the stack could be flipped by direct manipulation, for example, select the stack with the pointer and flip to the next picture with each additional select, like a new touch or a mouse button depression. The flip stack function is illustrated, using a pop-up menu 218, in the FIGS. 13-15.

Figure 15:
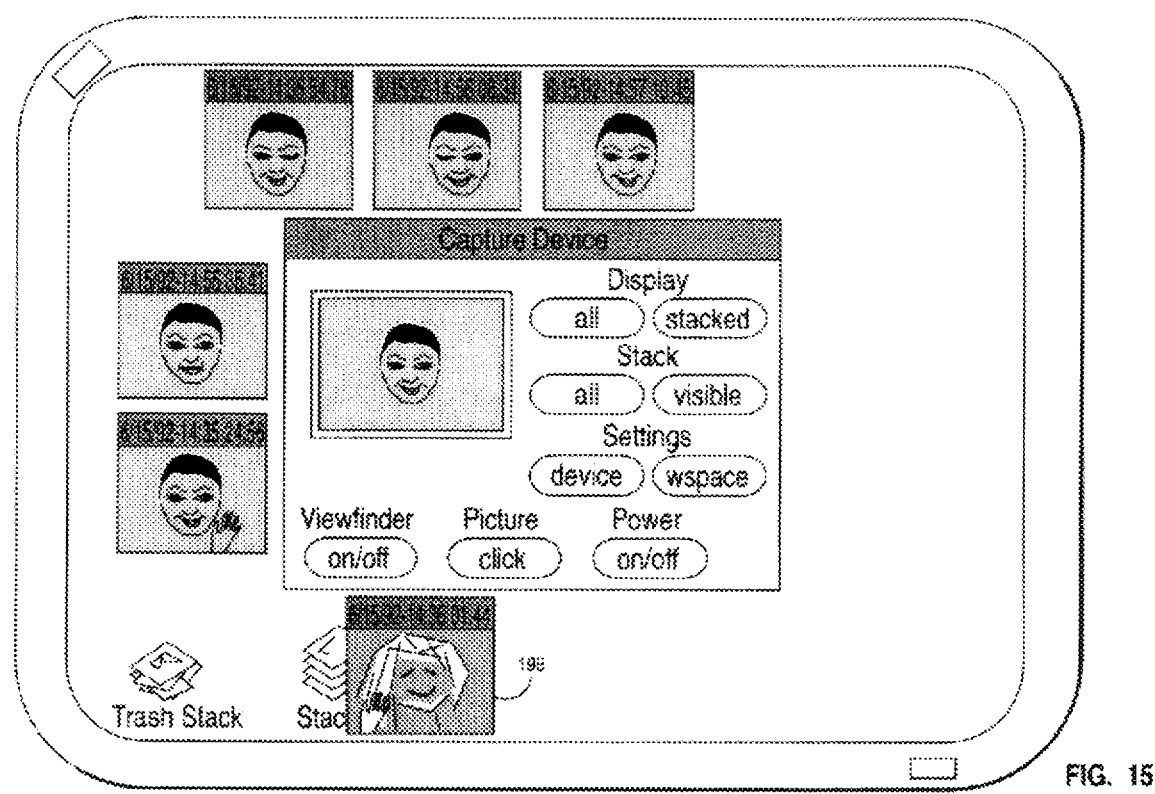
Figure 16:
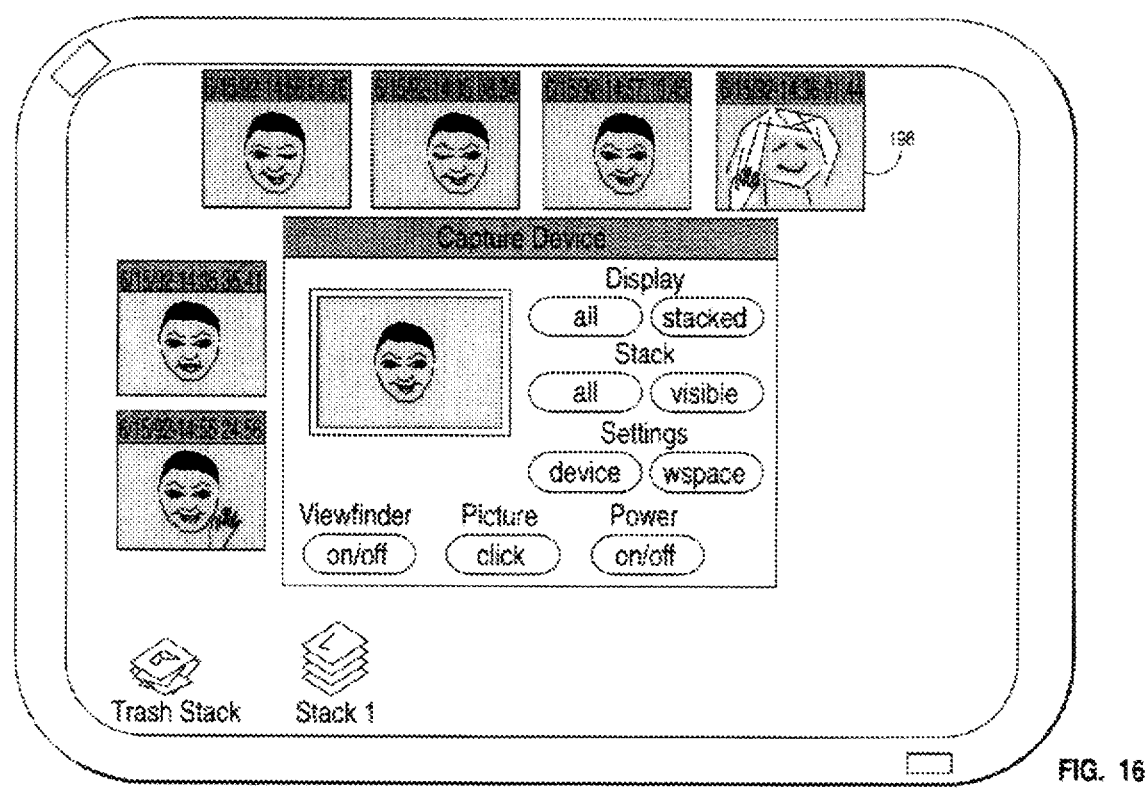
FIG. 16 is an illustration where an image object has been taken from a stack object.

When the desired picture 198 is located as shown in FIG. 15, the user could bring it to the work space by either executing a command from a pop-up menu or dragging the image window 198 to the general area of the work-space. This would result in the display shown in FIG. 16.

Figure 17:
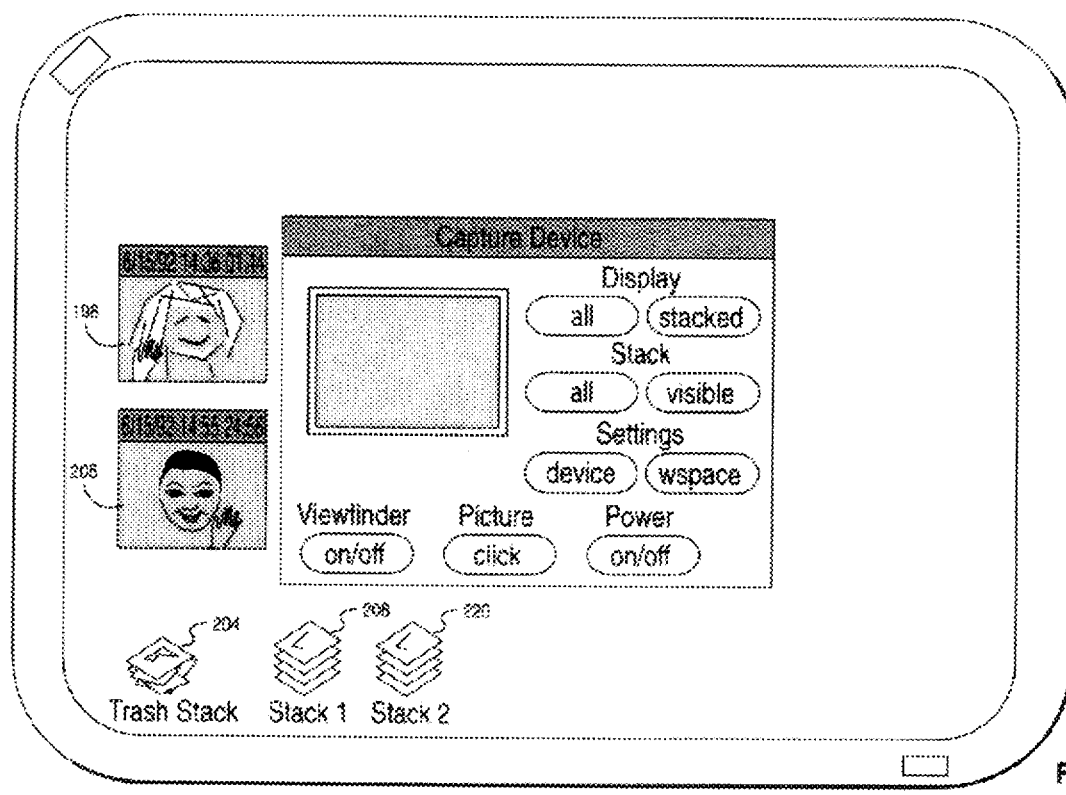
FIG. 17 is an illustration of a user interface having a plurality of stack objects, image objects and the capture device window.

The user might discard the unwanted images and save the desired images 198 and 208, or might stack the unwanted images in a new stack object 220. This new stacking operation directed to specific images, for example, the 2nd through 5th image windows 209 through 212 (FIG. 12) could result in the user interface as shown in FIG. 17.

Figure 18:
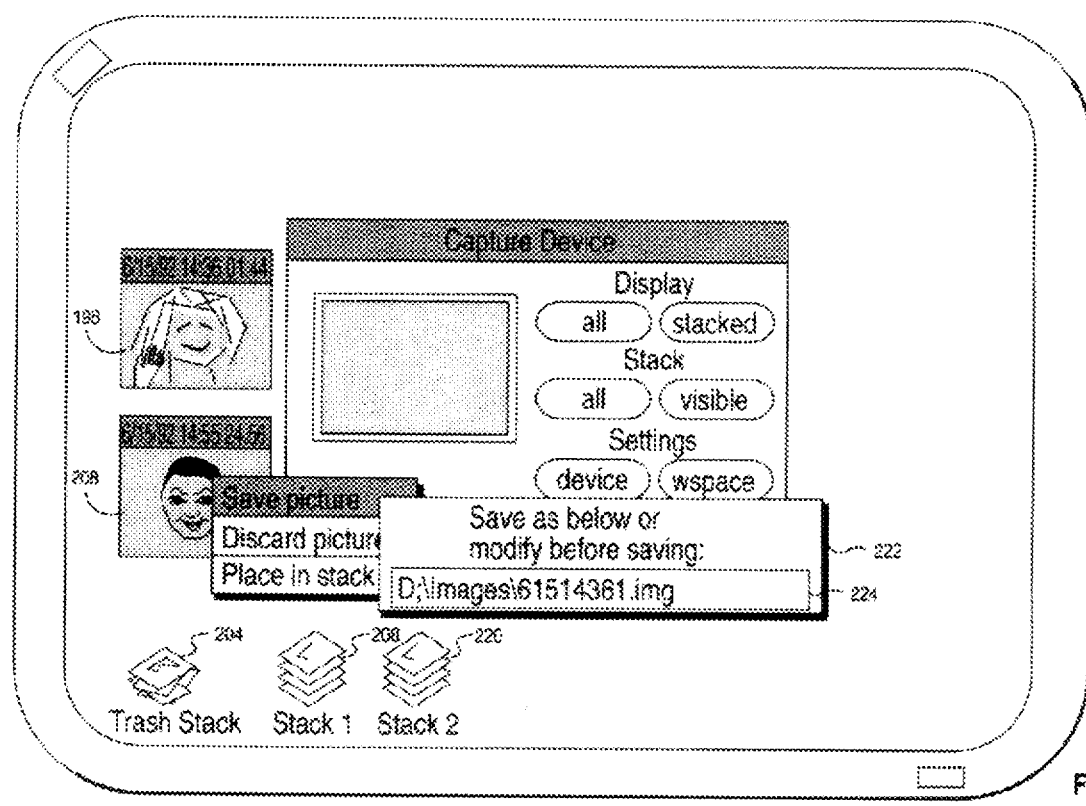
FIG. 18 is an illustration of the user interface when a first image is permanently stored.

The desired images 198 and 208 could be saved using the save dialog box 222 as illustrated in FIG. 18. The save dialog box 222 contains a field which contains the name under the the desired image 198 and 208 will be stored in permanent storage in the notebook computer.

The user would save the remaining image as with the previous image and then either continue the session or end the operation. The existing images in picture stacks would either be saved or deleted depending on the specific user customization.

The picture displays in the user interface could be set to different sizes to accommodate the users desire to get more or less nonoverlapping images on the screen at one time. Often quality and performance can be traded off for screen real estate. These functions could be accommodated via the settings functions of real-time functions allowing the user to adjust the sizes as needed during the capture session.

This approach would support capture devices that provide their own control functions and even those that have local storage capabilities. In these cases, the applications would start by downloading the images from the capture device, the images would appear on the workspace and thus the process of selection would be as described above without the instant feedback as each picture is taken.

Figure 19A:
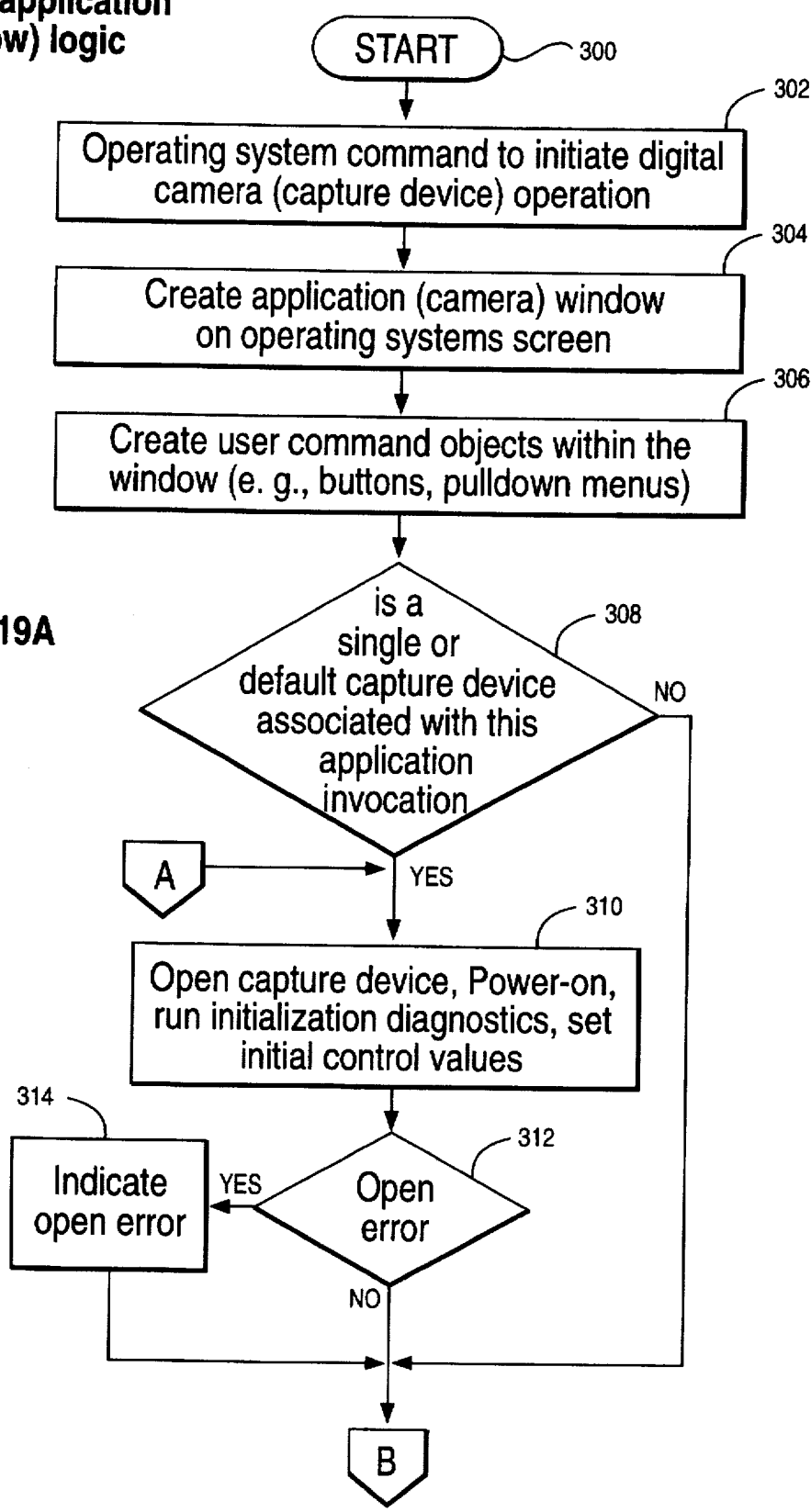
FIG. 19a–19e show a flow diagram of the main image capture device logic.

FIGS. 19A-19E comprise a flow diagram for the main image capture device application program. In FIG. 19A, the application starts 300 when the operating system receives a command to initiate operation of the image capture device application program 302. This could be done, for example, by clicking on a camera icon on the OS/2 desktop representing the image capture device application, to "open" the application. Next, the operating system creates the capture device window by calling data associated with the application 304. This data also includes the command objects within the capture device window, e.g., the picture, viewfinder and power buttons 306. The capture device object is presented on the computer display substantially as shown in FIG. 4.

Next, a test is performed for a default profile for the image capture device application 308. The profile might contain information on whether the image capture device should be powered upon window opening, diagnostic routines run and initial control values governing presentation of the images. If so, the profile is set up 310. If there is an error found during the diagnostic routines 312, a message will be presented on the computer display 314.

Figure 19B:
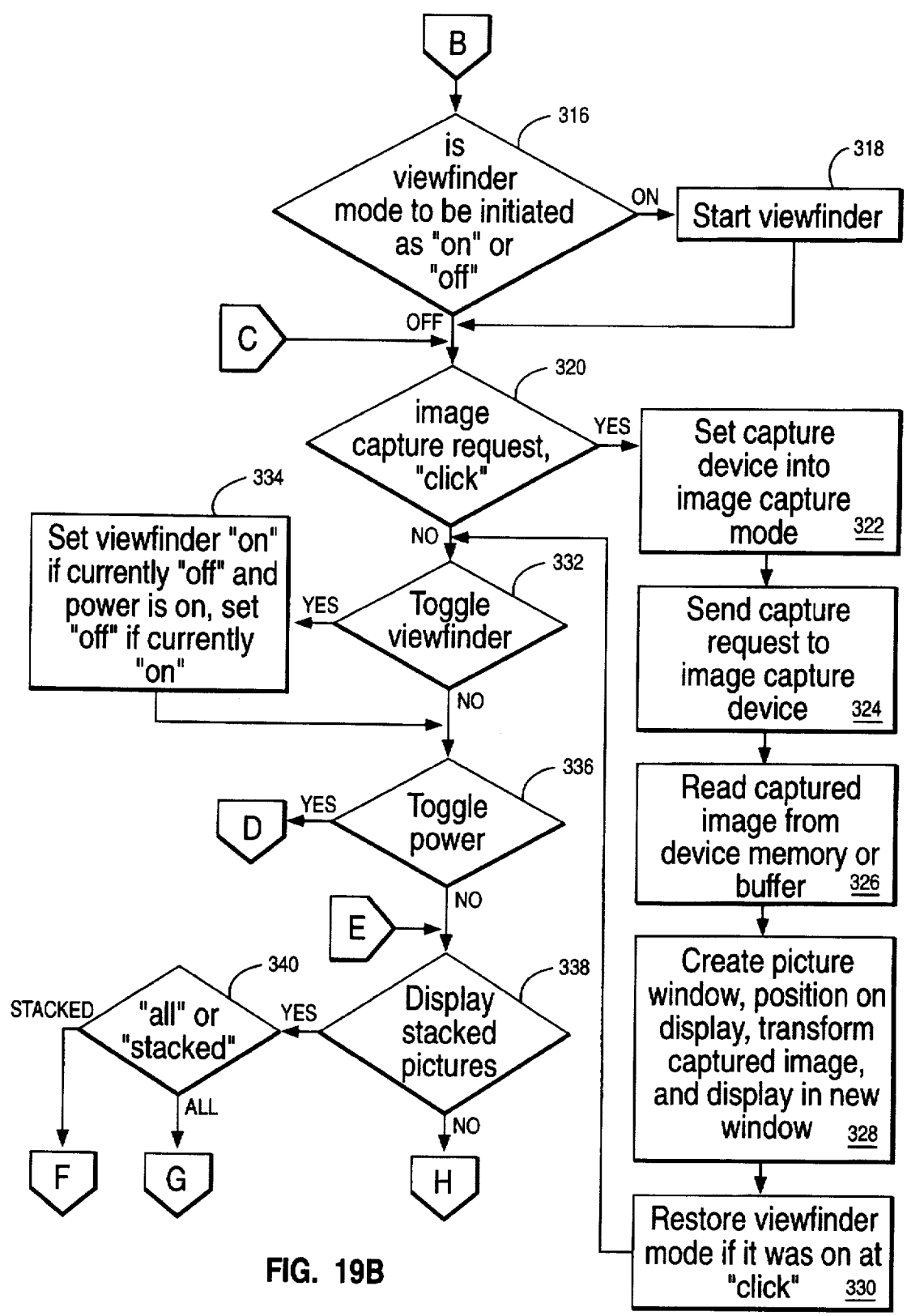

The flow diagram now shifts to FIG. 19B. A test 316 is performed to determine whether the viewfinder is to be initiated as "on" or "off". This information can be found in the profile. If so, the viewfinder object is created within the capture device window 318. The image information inside the viewfinder window changes as new images are sensed by the CCD array in the camera. Next, a test is performed whether the user has requested that the system capture an image 320 by clicking with a mouse button when the cursor is over the picture button in the capture device window. If so, the camera is set into image capture mode 322, a capture request is set to the camera microprocessor 324, and the image is taken with the appropriate exposure length and flash. The image captured by the CCD array of the camera is temporarily stored in the camera memory and then read into the main memory of the computer 326. The image information is used to create a new image object which is positioned on the display as shown in FIG. 5. The viewfinder mode is restored if before the image was captured, the viewfinder was on 330.

Figure 19C:
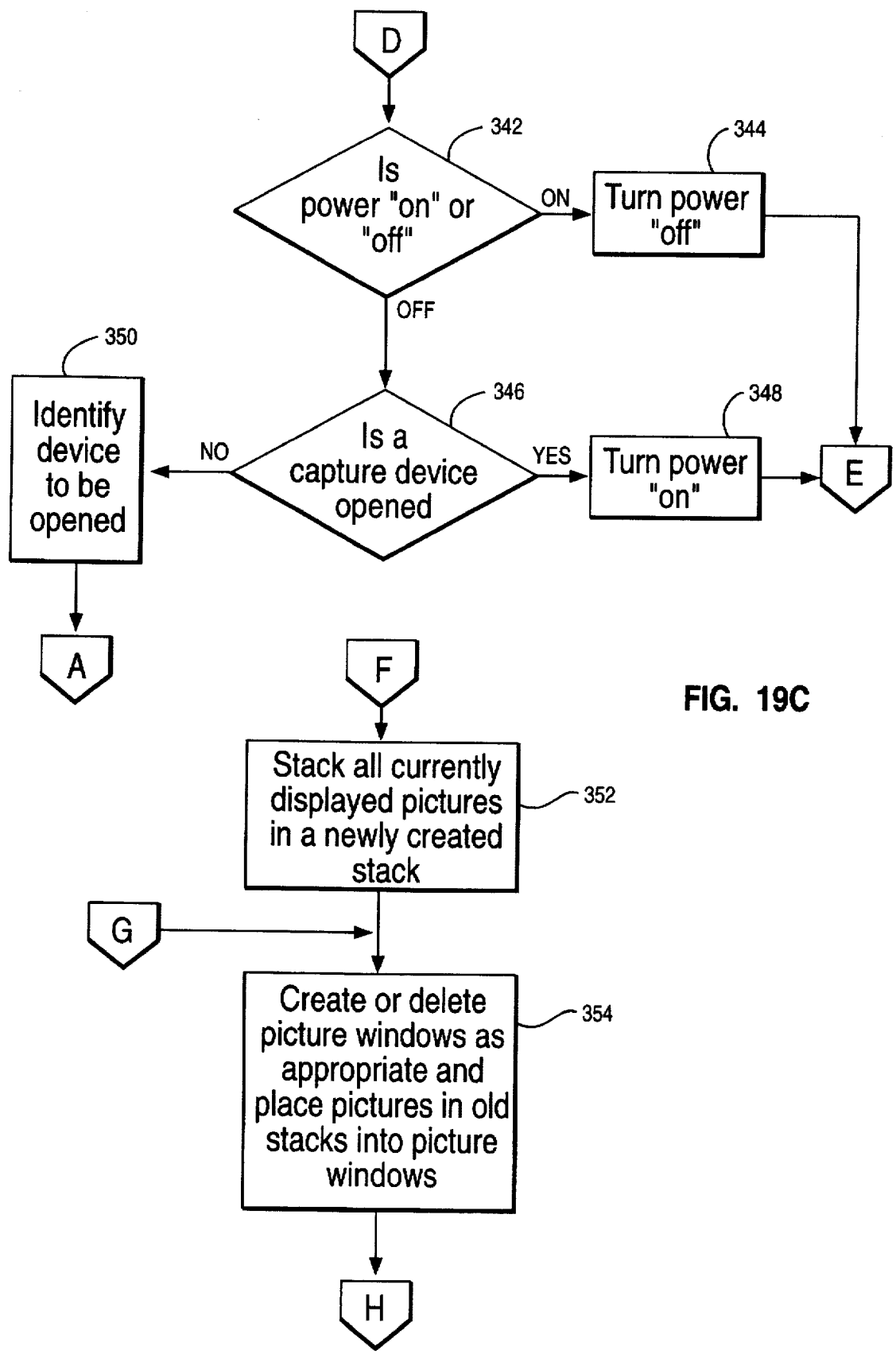

If there was no image capture request, or if the image capture request was Complete, a test is performed to determined whether the viewfinder should be toggled 332, i.e., the user clicked over the viewfinder button. If the answer is yes, the viewfinder window is hidden if it is currently shown, or it is revealed if it is currently hidden 334. There is a test 336 whether the power should be toggled. If not, the test is performed whether image objects in any existing stack object should be displayed 338. If not, the process goes to H in FIG. 19D. If so, a test is performed whether the image objects should all be displayed or only those in the current stack 340. If all are to be displayed step 354 in FIG. 19C is performed where the appropriate action is to display all captured image objects best as possible. If the only those which are in a particular stack object are to be displayed, first a new stack object is to be created 352 for the currently displayed images, then the images in the existing stack object are placed into image windows 354.

If the power is to be toggled 336, i.e., the user has clicked on the power button in the capture device window, the procedure flows to D in FIG. 19C where a test is made to determine whether the power is on or off 342. If it is on, the camera power is turned off 344, presumably because the picture session has ended. The method then continues back to the tests In FIG. 19B on how the captured images should be displayed on the computer screen. If the image capture device power is off, a test is performed to determine whether a capture device window has been opened. If so, the camera power is turned on. If not, the user is requested to identify the image capture device application program and the capture device which is to controlled 350. Then the method returns to A in FIG. 19A.

Figure 19D:
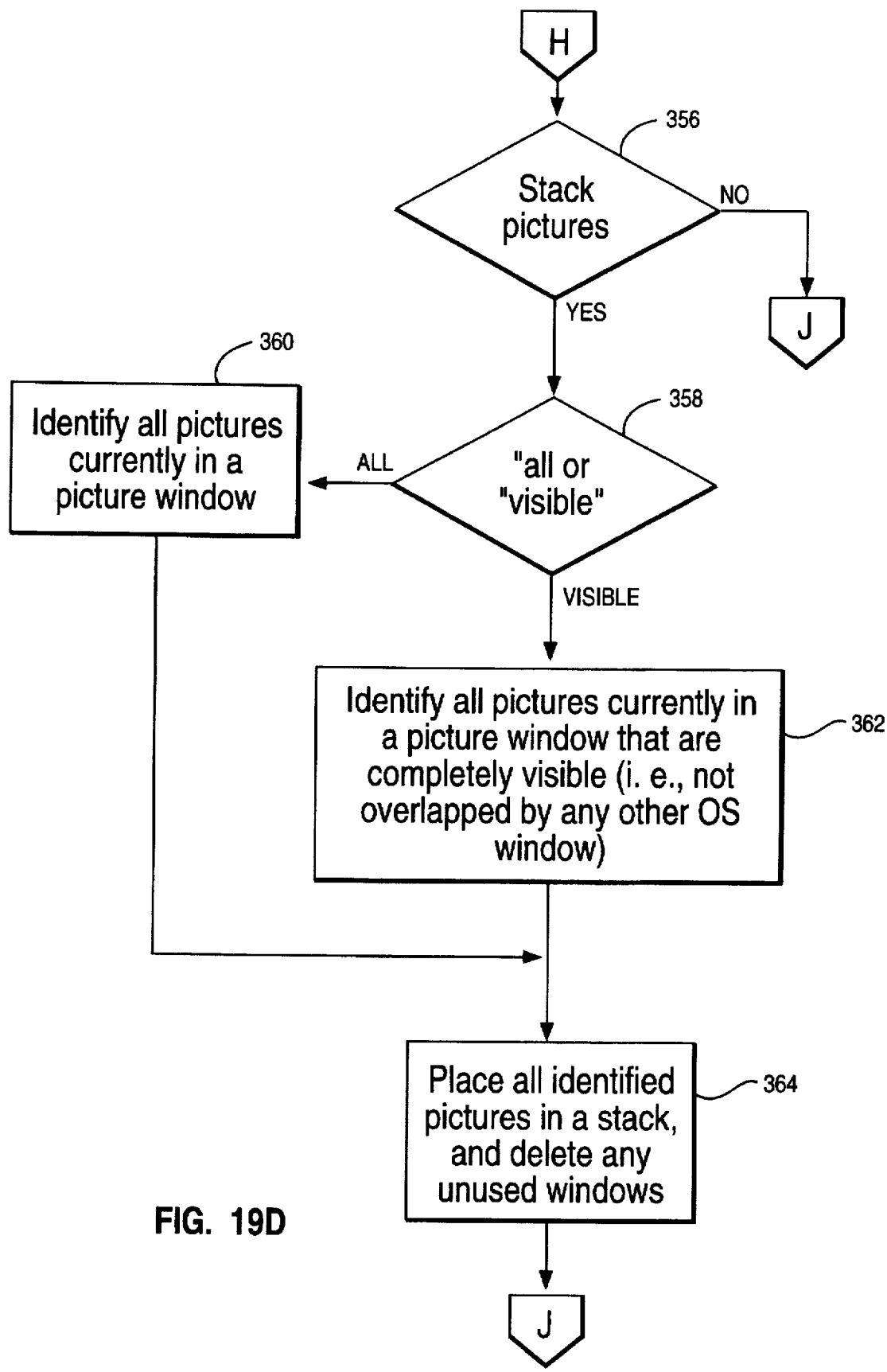

Once the requested image windows are displayed as requested, in FIG. 19D, a test is performed whether the user has asked for a stack pictures operation 356. If so, a test is performed whether all image objects currently displayed should be placed in the stack object or only those which are fully visible, on top of other image windows 358. Processes 360, 362 are performed to identify either all image objects in an image window or only those which are fully visible as appropriate. Once the image objects are identified, they are placed in the stack object, preferably in the order in which they were taken, then the unneeded image windows deleted from the user interface 364.

Figure 19E:
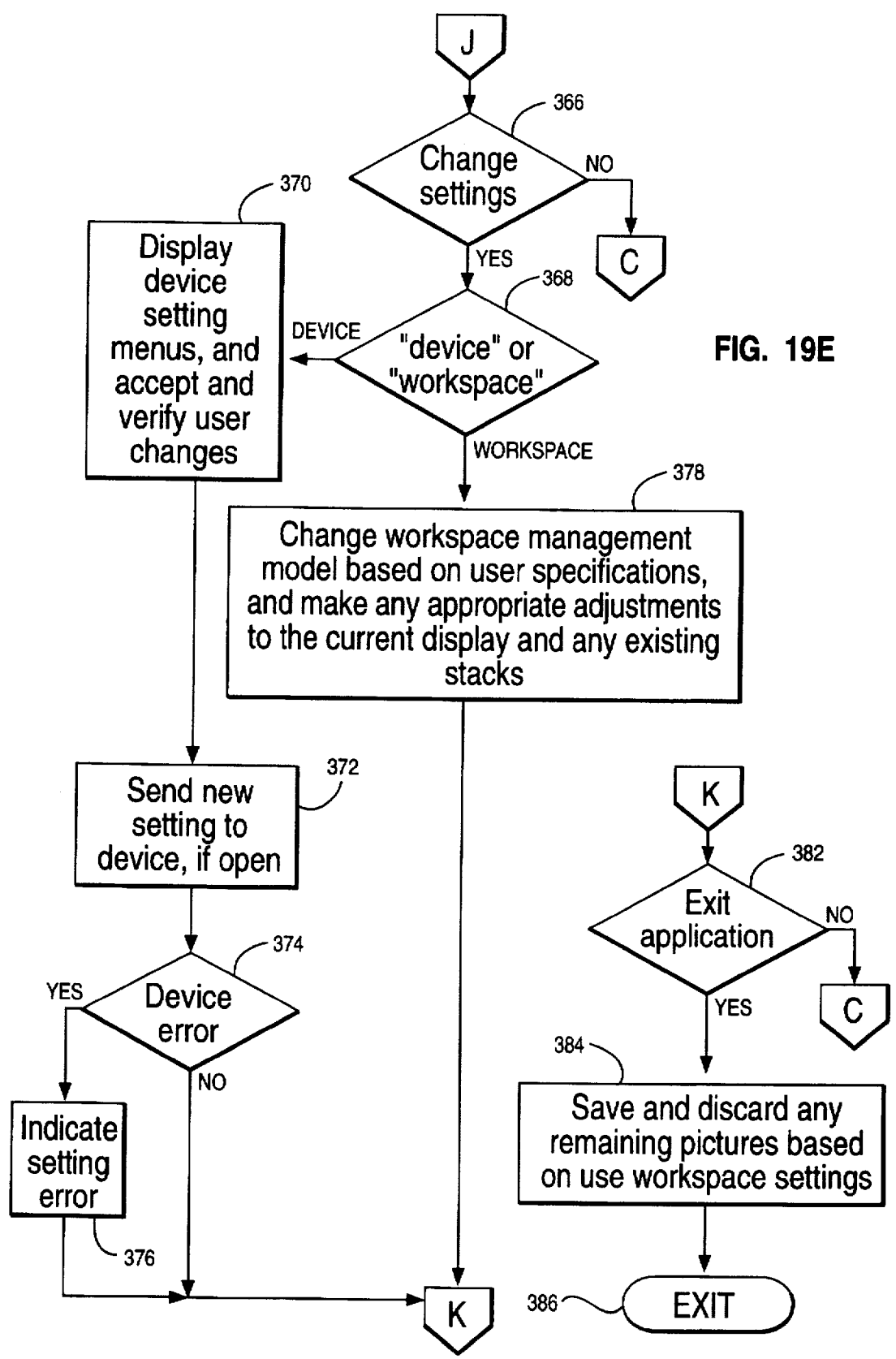

Proceeding to FIG. 19E, a test 366 is performed whether the user has requested to change any of the camera/computer settings. Next, a test is made whether device or workspace parameters are to be changed 368. If the device or camera settings are to be changed, a menu of the current settings are displayed and changes are accepted if made by the user 370. The new changes are sent to the camera 372, tests performed to determine whether the new settings were changed successfully 374, and error messages sent back to the computer if the new settings were not successfully made 376.

If the workspace parameters are to be changed, a menu showing the current setting is displayed, changes in the parameters made according to user specifications and the display refreshed to reflect those changes 378.

A test 382 is performed whether the user has indicated that the application is to be ended 382. If not, the procedure returns to C in FIG. 19B. If so, the image objects currently displayed in image windows or temporarily stored in the stack objects are either saved or discarded according to the workspace defaults or user commands made during the image capture session 384. The application ends 386 and the display is returned to the OS/2 desktop.

Figure 20:
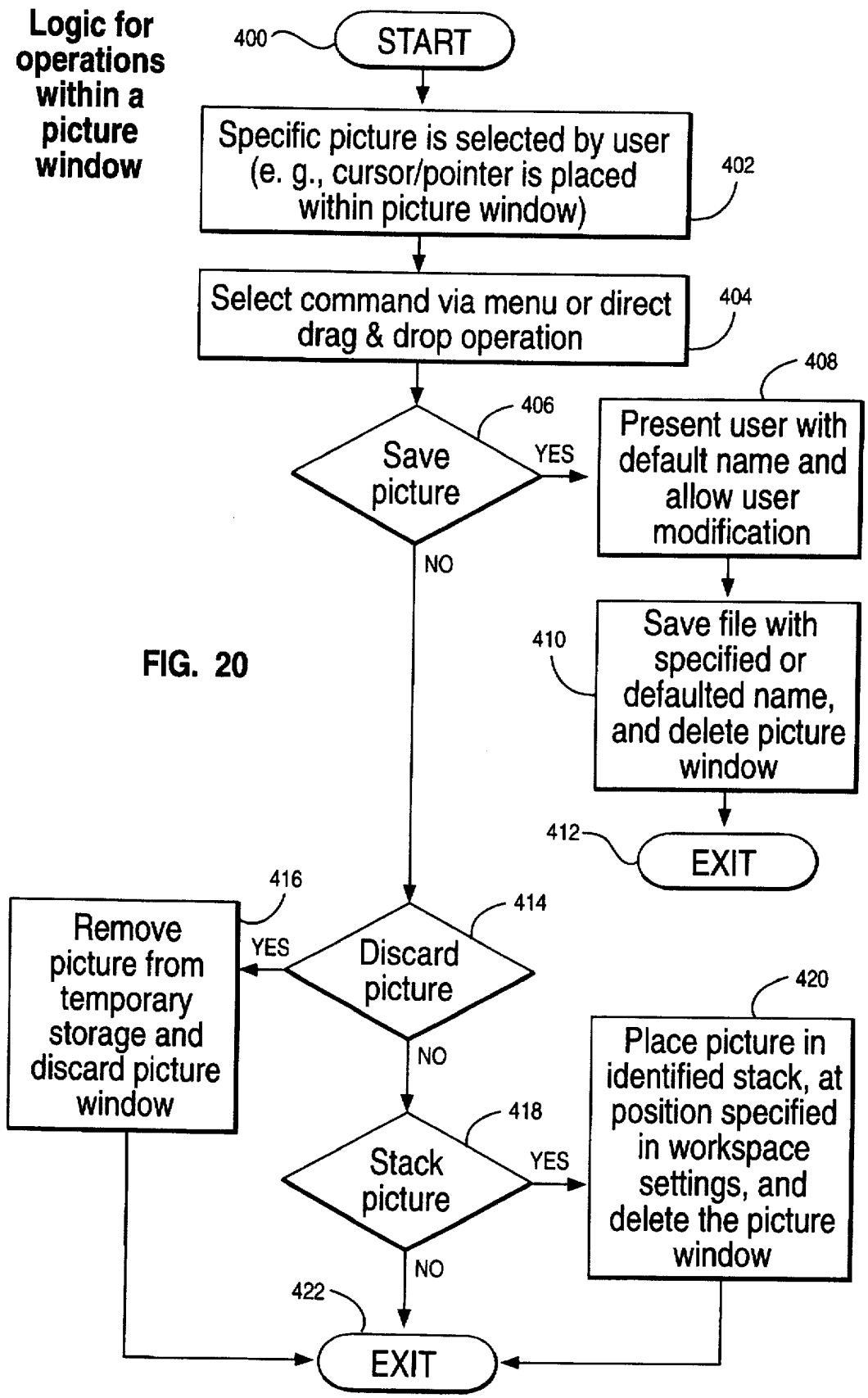
FIG. 20 is a flow diagram of the logic for operations within a picture window.

FIG. 20 is a flow diagram for the operations within an image or picture window. The process starts 400 when a specific picture is chosen by the user, i.e., the mouse pointer is placed over the image window and a mouse button depressed 402. Depending on the embodiment of the user interface implemented, either a pop-up menu, e.g., a discard menu, will appear or the user will perform a grab and drag operation, e.g., grabbing the image window and dragging it to a trash stack icon 404. A number of tests are performed to determine whether the user wants to save the picture 406, discard the picture 414 or stack the picture 418. If the picture is selected for permanent storage, the user is presented with the default name and offered the opportunity to change it if desired 408. The image object is saved with the specified or default name and the image window is deleted from the display 410. The process ends 412. If the image object is to be discarded, the picture is removed from temporary storage and discarded 416. The discard may be into the specialized trash stack object which may allow the user to change his mind. If the picture is to be stacked in a stack object, the image object is placed in the identified stack object at a position as specified in workspace settings, e.g., chronological order, and the image window is deleted from the user interface display 420. The operation ends 422.

Figure 21:
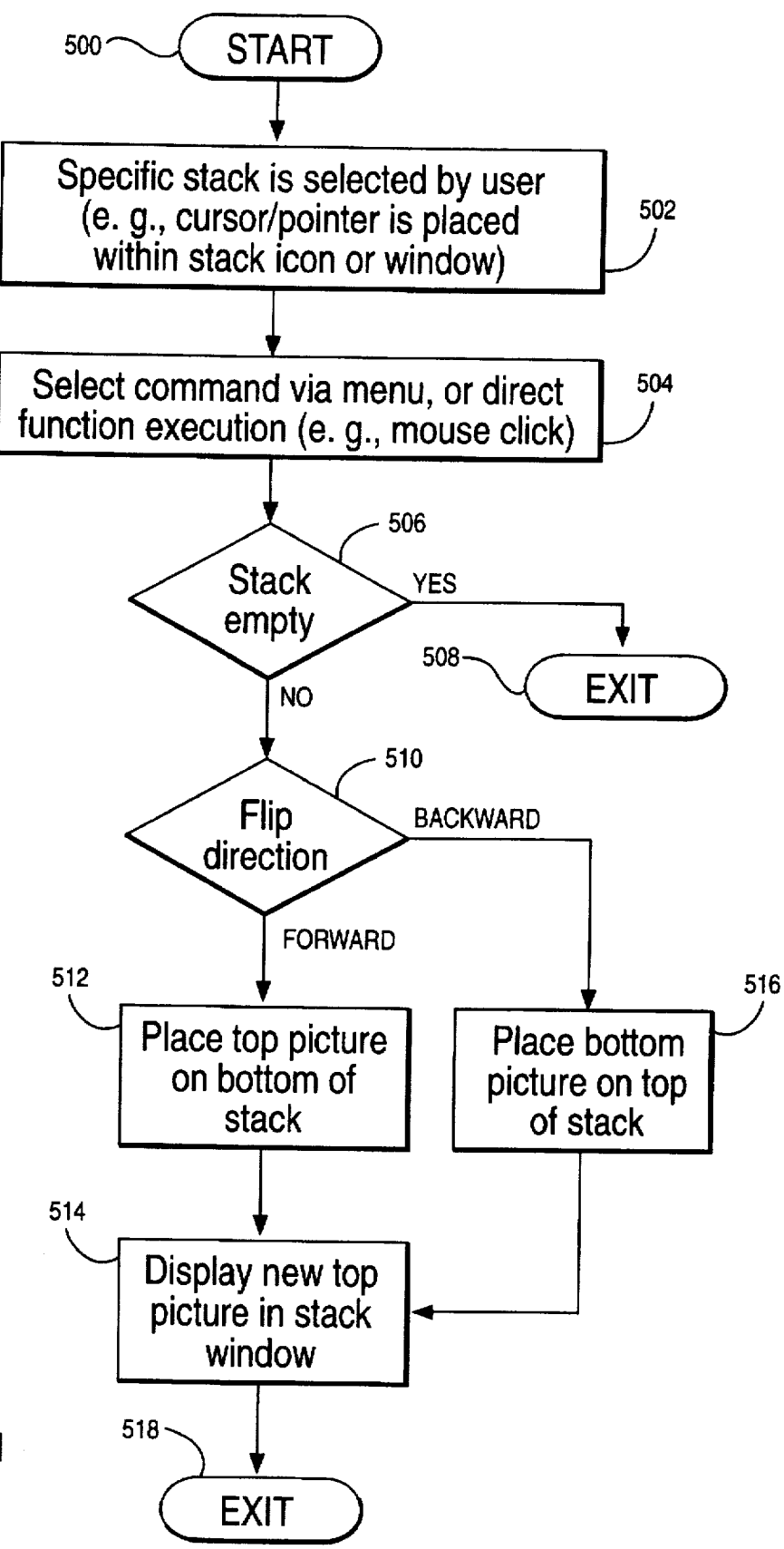
FIG. 21 is a flow diagram of the logic for operations within a picture stack object.

FIG. 21 is a flow diagram for flip operations with a stack object. The process starts 500 as a selected stack is specified by a user, e.g., the mouse cursor is placed over the stack icon representing the stack object in the interface 502. Next, a stack operation is selected by the user 504, in this case the flip operation. The user will be able to flip through the stack displaying in turn all the images in the stack object. If the stack is empty 506, the program ends 508. If the stack object has image objects embedded therein and the stack operation chosen is to flip through the stack, a test 510 is performed to determine which direction the stack object is to be flipped. This could be by default setting in the profile or by a user selection on the flip menu. If the forward direction is chosen, top image object handle is placed at the bottom of the list which holds the image object handles in the stack object 512 and the next image object, now the new top image object is displayed 514. If the flip direction is backward, the bottom image object handle is taken from the bottom of the handle list in the stack object and placed first 516. Since the old bottom object is now the new top object, it is displayed 514. The process ends 518, although the user can restart the process 500 if he wishes to continue flipping through the stack.

The specification has not gone into great detail in the creation of window handles for the various objects in the user interface nor discussed the data structures which contain the data used to determine the objects' behavior. As the invention is preferably run in OS/2, the reader is referred to the OS/2 2.0 references cited above with which many application programmers are familiar.

As digital image capture becomes more feasible on more computer platforms the need for simple yet sophisticated operation becomes paramount to the success of expanded usage. Digital image capture does not yet offer the quality available with film based cameras; however, the quality is becoming more generally usable and the unique aspects of computer attached instant capture devices can be exploited to offer compensating benefits over film based image capture for many applications. This invention offers a familiar model with all the benefits of the near instant results in digital image capture. In addition to controlling the capture device, the invention manages a work space on the computer's screen in a natural and efficient way to allow full exploitation of the power of digital image capture. As these attachments become more and more viable for portable (i.e., battery operated) computers this work space management becomes critical to the efficient operation of the computer with the attached capture device.

While the invention has been described with respect to particular embodiments above it would be understood by those skilled in the art that modifications may be made without departing from the skill and scope of the present invention. These embodiments are for purposes of example and illustration only and are not to be taken to limit the scope of the invention narrower than the scope of the appended claims.

We claim:

1. A method for optimizing a set of images captured by an image capture device coupled to a computer system comprising the steps of:

displaying an image capture device object in an image capture device window on a computer system display, the image capture device object containing a viewfinder object which includes a constantly refreshed display of a current image sensed by the image capture device and control objects which if selected cause the computer to send control signals to the image capture device;

responsive to the selection of an image capture control object, capturing a first image sensed by the image capture device;

storing in a system memory a first image object containing the first image; and, displaying a representation of the first image object in a first window separate from the image capture device window and nonoverlapping with the view finder object on the computer system display;

so that a user can compare the current image to the first image to determine whether the current image should be added to the set of captured images.

2. The method as recited in claim 1 further comprising the steps of:

responsive to repeated selection of the image capture control object, capturing a plurality of images sensed by the image capture device corresponding to times of selection of the image capture control object;

creating a plurality of image objects each containing a corresponding image of the plurality of images; and simultaneously displaying representations of the plurality of image objects each in a corresponding window of a plurality of windows on the computer system display.

3. The method as recited in claim 2 further comprising the steps of:

responsive to the selection of a delete operation and the selection of a second image object, removing a representation of the second image object from the display;

responsive to the selection of the delete operation, creating a trash stack object to contain deleted image objects represented as a trash stack icon on the display; and storing the second image object in the trash stack object.

4. The method as recited in claim 3 wherein the delete operation is initiated by selecting a delete option in a pop-up menu.

5. The method as recited in claim 2 further comprising the steps of:

responsive to a selection of a stack operation, creating a stack object for containing image objects representing the stack object with an icon on the display;

removing a set of the plurality of image objects from the display; and storing the set of image objects in the stack object.

6. The method as recited in claim 5 further comprising the steps of:

responsive to a selection of a flip operation, displaying the representation of the first image object in the set of image objects in the stack object on the display;

responsive to a second selection of the flip operation, removing the first image object representation from the display; and displaying a representation of a next image object in the set of image objects in the stack object on the display.

7. The method as recited in claim 1 wherein the image capture device object also contains control objects which if selected cause the presentation of image objects to change.

8. The method as recited in claim 7 wherein the image capture device object also contains control objects which if selected cause the storage of image objects to change.

9. An image capture device coupled to a computer system in which a set of captured images is optimized comprising:

an image capture device object stored in a memory and for presentation in an image capture device window on a computer system display, the image capture device object containing a viewfinder object which includes a constantly refreshed display of a current image sensed by the image capture device;

a set of control objects stored in a memory and for presentation on the computer system display which if selected cause the computer to send control signals to the image capture device; and, a first image object stored in the memory containing a first image captured by the image capture device, a representation of which is presented in a first window separate from the image capture device window and nonoverlapping with the viewfinder object on the computer system display;

so that a user can compare the current image to the first image to determine whether the current image should be added to the set of captured images.

10. The device as recited in claim 9 further comprising:

means responsive to repeated selection of the image capture control objects for capturing a plurality of images sensed by the image capture device corresponding to times of selection of the image capture control objects;

means for storing in the memory a plurality of image objects each containing a corresponding image of the plurality of images; and means for simultaneously displaying representations of the plurality of image objects each in a corresponding window of a plurality of windows and nonoverlapping with the viewfinder object on the computer system display.

11. The device as recited in claim 10 further comprising:

means responsive to the selection of a delete operation and the selection of a second image object for removing a representation of the second image object from the display;

means for responsive to the selection of the delete operation, creating a trash stack object to contain deleted image objects represented on the display as a trash stack icon; and means for storing the second image object in the trash stack object.

12. The device as recited in claim 11 wherein the delete operation is initiated by selecting a delete option in a pop-up menu.

13. The device as recited in claim 10 further comprising:

means responsive to a selection of a stack operation for creating a stack object for containing image objects representing the stack object with an icon on the display;

means for removing a set of the plurality of image objects from the display; and means for storing the set of image objects in the stack object.

14. The device as recited in claim 13 further comprising:

means responsive to a selection of a flip operation for displaying the representation of the first image object in the set of image objects in the stack object on the display;

means responsive to a second selection of the flip operation for removing the first image object representation from the display; and means for displaying a representation of a next image object in the set of image objects on the display.

15. The device as recited in claim 10 further comprising:

an image sensor coupled to a camera bus for continuously sensing radiation in the visible spectrum;

a flash coupled to the camera bus for providing illumination; and a microprocessor coupled to the camera bus and control line from the computer system for passing control signals from the computer system to the image sensor and the flash.

16. The device as recited in claim 15 wherein the computer system comprises:

the display coupled to a system bus for display of the viewfinder object, the control objects and the first image object;

the memory coupled to the system bus for storage of the objects and for a set of instructions for manipulation of the objects;

an input device coupled to the system bus for creating input signals indicative of user selections; and a processor coupled to the system bus for controlling the computer system and the image capture device according to the set of instructions and the input signals.

17. A user interface for optimizing a set of images captured by an image capture device coupled to a computer system comprising:

an image capture device object stored in a memory and for presentation in an image capture device window on a computer system display, the image capture device object containing a viewfinder object which includes a constantly refreshed display of a current image sensed by the image capture device and a set of control objects which if selected cause the computer to send control signals to the image capture device; and, a first image object stored in the memory containing a first image captured by the image capture device, a representation of which is presented in a first window separate from the image capture device window and nonoverlapping with the viewfinder object on the computer system display;

so that a user can compare the current image to the first image to determine whether the current image should be added to the set of captured images.

18. The user interface as recited in claim 17 further comprising:

a plurality of image objects stored in the memory each containing a corresponding image of a plurality of images captured by the image capture device, a representation of each simultaneously presented in a corresponding window of a plurality of windows on the computer system display.

19. The user interface as recited in claim 18 further comprising:

a trash stack object stored in the memory to contain a set of deleted image objects and represented on the display as a trash stack icon.

20. The user interface as recited in claim 19 which further comprises a pop-up menu including a delete selection for removing an image object representation from the display.

21. The user interface as recited in claim 18 further comprising:

a stack object stored in the memory for containing a set of image objects and represented on the display as a stack icon.

22. The user interface as recited in claim 21 further comprising:

means responsive to a selection of a flip operation for displaying the representation of the first image object in the set of image objects on the display; and means for replacing the first image object representation with a second image object representation of a second image object in the set of image objects on the display.

23. A computer program product in a readable medium for optimizing a set of images captured by an image capture device coupled to a computer system, executable on the computer system comprising:

program code means for displaying an image capture device object in a image capture device window on a computer system display, the image capture device object containing a viewfinder object which includes a constantly refreshed display of a current image sensed by the image capture device and control objects which if selected cause the computer to send control signals to the image capture device;

program code means responsive to the selection of an image capture control object for capturing a first image sensed by the image capture device;

program code means for creating a first image object containing the first image; and, program code means for displaying a representation of the first image object in a first window separate from the image capture device window and non overlapping with the viewfinder object on the computer system display;

so that a user can compare the current image to the first image to determine whether the current image should be added to the set of captured images.

24. The product as recited in claim 23 further comprising:

means responsive to repeated selection of the image capture control object for capturing a plurality of images sensed by the image capture device corresponding to times of selection of the image capture control object;

means for storing in a system memory a plurality of image objects each containing a corresponding image of the plurality of images; and means for simultaneously displaying representations of the plurality of image objects each in a corresponding window of a plurality of windows and non overlapping with the viewfinder object on the computer system display.

25. The product as recited in claim 24 further comprising:

means responsive to the selection of a delete operation and the selection of a second image object for removing a representation of the second image object from the display;

responsive to the selection of the delete operation, creating a trash stack object to contain deleted image objects represented on the display as a trash stack icon; and means for storing the second image object in the trash stack object.

26. The product as recited in claim 25 wherein the delete operation is initiated by selecting a delete option in a pop-up menu.

27. The product as recited in claim 24 further comprising:

means responsive to a selection of a stack operation for creating a stack object for containing image objects representing the stack object with an icon on the display;

means for removing a set of the plurality of image objects from the display; and means for storing the set of image objects in the stack object.

28. The device as recited in claim 27 further comprising:

means responsive to a selection of a flip operation for displaying the representation of the first image object in the set of image objects in the stack object on the display;

means responsive to a second selection of the flip operation removing the first image object representation from the display; and means for displaying a representation of a next image object in the set of image objects in the stack object on the display.

* * * * *